US012199734B2

(12) United States Patent
Abedini et al.

(10) Patent No.: US 12,199,734 B2
(45) Date of Patent: Jan. 14, 2025

(54) TECHNIQUES FOR USING MULTI-CONNECTED REPEATERS IN WIRELESS COMMUNICATIONS

(71) Applicant: QUALCOMM Incorporated, San Diego, CA (US)

(72) Inventors: Navid Abedini, Basking Ridge, NJ (US); Jianghong Luo, Skillman, NJ (US); Tao Luo, San Diego, CA (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/537,006

(22) Filed: Nov. 29, 2021

(65) Prior Publication Data
US 2022/0182130 A1    Jun. 9, 2022

Related U.S. Application Data

(60) Provisional application No. 63/121,849, filed on Dec. 4, 2020, provisional application No. 63/121,836, filed on Dec. 4, 2020.

(51) Int. Cl.
*H04B 7/155* (2006.01)
*H04W 72/20* (2023.01)
(Continued)

(52) U.S. Cl.
CPC ........ *H04B 7/15528* (2013.01); *H04W 72/20* (2023.01); *H04W 72/54* (2023.01);
(Continued)

(58) Field of Classification Search
CPC .. H04B 7/15528; H04W 16/26; H04W 72/20; H04W 72/54; H04W 76/15
See application file for complete search history.

(56) References Cited

U.S. PATENT DOCUMENTS

2011/0194483 A1* 8/2011 Ji ................... H04W 36/0033
                                                        370/315
2012/0257531 A1* 10/2012 Ko ................... H04L 5/0053
                                                        370/252
(Continued)

FOREIGN PATENT DOCUMENTS

EP          3028531 A1    6/2016
WO        2021021428      2/2021

OTHER PUBLICATIONS

Partial International Search Report—PCT/US2021/061189—ISA/EPO—Mar. 29, 2022.
(Continued)

*Primary Examiner* — Gary Mui
(74) *Attorney, Agent, or Firm* — Arent Fox LLP/Qualcomm Incorporated

(57) ABSTRACT

Aspects described herein relate to establishing a control connection with at least a first node and a second node for receiving control information for providing a repeater function between two or more wireless nodes. Control information can be communicated over the control connection from one or more of at least the first node or the second node. The repeater can provide, based on the control information, the repeater function between the two or more wireless nodes. Other aspects relate to establishing a control connection with a first node for receiving control information for providing a repeater function for one or more upstream nodes, receiving control information over the control connection, determining a conflict in receiving the control information or a conflict within the control information for two or more upstream nodes, and providing, based on the control information and conflict, the repeater function for the one or more upstream nodes.

17 Claims, 18 Drawing Sheets

(51) Int. Cl.
*H04W 72/54* (2023.01)
*H04W 76/14* (2018.01)
*H04W 76/15* (2018.01)
*H04W 84/02* (2009.01)
*H04W 92/16* (2009.01)

(52) U.S. Cl.
CPC ........... *H04W 76/14* (2018.02); *H04W 76/15* (2018.02); *H04W 84/02* (2013.01); *H04W 92/16* (2013.01)

(56) References Cited

U.S. PATENT DOCUMENTS

| | | | | |
|---|---|---|---|---|
| 2016/0198389 | A1* | 7/2016 | Cao | H04W 40/22 370/315 |
| 2018/0092139 | A1* | 3/2018 | Novlan | H04W 8/005 |
| 2019/0014592 | A1 | 1/2019 | Hampel et al. | |
| 2019/0053317 | A1* | 2/2019 | Hampel | H04W 28/082 |
| 2019/0223002 | A1* | 7/2019 | Novlan | H04W 72/20 |
| 2019/0296881 | A1 | 9/2019 | Ang et al. | |
| 2019/0305923 | A1* | 10/2019 | Luo | H04L 5/16 |
| 2019/0349079 | A1* | 11/2019 | Novlan | H04B 7/15542 |
| 2020/0067687 | A1* | 2/2020 | Qin | H04L 5/0005 |
| 2020/0367257 | A1 | 11/2020 | Hormis et al. | |
| 2021/0045041 | A1* | 2/2021 | Sharma | H04W 76/10 |
| 2021/0345218 | A1* | 11/2021 | Tsuda | H04W 92/14 |
| 2022/0007151 | A1* | 1/2022 | Shibata | H04W 92/12 |
| 2022/0183043 | A1* | 6/2022 | Abedini | H04B 7/15528 |
| 2022/0264413 | A1* | 8/2022 | Fujishiro | H04W 76/20 |
| 2022/0369309 | A1* | 11/2022 | Li | H04W 72/27 |
| 2023/0098258 | A1* | 3/2023 | Fan | H04W 40/12 370/329 |
| 2023/0117489 | A1* | 4/2023 | Liu | H04W 40/22 370/329 |

OTHER PUBLICATIONS

Qualcomm: "NR Repeaters", 3GPP Draft, 3GPP TSG RAN Meeting #90e, RP-202750, 3RD Generation Partnership Project (3GPP), Mobile Competence Centre, 650, Route Des Lucioles, F-06921 Sophia-Antipolis Cedex, France, vol. TSG RAN, No. Electronic Meeting, Dec. 7, 2020-Dec. 11, 2020 Nov. 30, 2020 (Nov. 30, 2020), XP051963304, 13 Pages, Retrieved from the Internet: URL: https://ftp.3gpp.org/tsg_ran/TSG_RAN/TSGR_90e/Docs/RP-202750.zip RP-202750 NR Repeaters Motivation.pdf [retrieved on Nov. 30, 2020] pp. 4-9, pp. 5-10.

International Search Report and Written Opinion—PCT/US2021/061189—ISA/EPO—Jun. 15, 2022.

* cited by examiner

TECHNIQUES FOR USING MULTI-CONNECTED REPEATERS IN WIRELESS COMMUNICATIONS

CLAIM OF PRIORITY UNDER 35 U.S.C. § 119

The present application for patent claims priority to Provisional Patent Application No. 63/121,849, entitled "TECHNIQUES FOR USING MULTI-CONNECTED REPEATERS IN WIRELESS COMMUNICATIONS" filed Dec. 4, 2020, and Provisional Patent Application No. 63/121,836, entitled "TECHNIQUES FOR CONFLICT AVOIDANCE OR RESOLUTION FOR MULTI-CONNECTED REPEATERS IN WIRELESS COMMUNICATIONS" filed Dec. 4, 2020, which are assigned to the assignee hereof and hereby expressly incorporated by reference herein for all purposes.

BACKGROUND

Aspects of the present disclosure relate generally to wireless communication systems, and more particularly, to wireless communications using repeaters between upstream and downstream nodes.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In wireless communication technologies such as 5G NR, nodes can beamform antenna resources to transmit and receive beams in certain spatial directions to improve hearability of the signals. In addition, repeaters can be used between nodes to receive and forward communications therebetween to further improve hearability of the signals and improve quality of communications between the nodes. There are multiple types of repeaters that can be used in wireless communications (e.g., in 5G NR), including repeaters having an amplify and forward functionality. For example, a repeater may include a fronthaul link with an upstream node, such as a gNB, over which the repeater can receive control information for operating a repeater function and also over which the repeater can communicate with the gNB to perform the repeater function (e.g., to receive downlink communications, forward uplink communications, etc.). In addition, the repeater may include an access link with a downstream node, such as a user equipment (UE), over which the repeater can communicate with the UE to perform the repeater function (e.g., to receive uplink communications, forward downlink communications, etc.).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications at a repeater is provided that includes establishing a control connection with at least a first node and a second node for receiving control information for providing a repeater function between two or more wireless nodes, receiving the control information over the control connection from one or more of at least the first node or the second node, and providing, based on the control information, the repeater function between the two or more wireless nodes.

In another example, a method for wireless communication at an upstream node is provided that includes establishing a control connection with a repeater to provide the repeater with control information for providing a repeater function between two or more wireless nodes, wherein the control connection with the repeater includes at least a first node and a second node, and transmitting, to the repeater, the control information for providing the repeater function.

In another example, an apparatus for wireless communication is provided that includes a transceiver, a memory configured to store instructions, a mobile termination unit, a repeater unit, and one or more processors communicatively coupled with the memory and the transceiver. The one or more processors are configured to establish, via the mobile termination unit, a control connection with at least a first node and a second node for receiving control information for providing a repeater function between two or more wireless nodes, receive the control information over the control connection from one or more of at least the first node or the second node, and provide, via the repeater unit and based on the control information, the repeater function between the two or more wireless nodes.

In another example, an apparatus for wireless communication is provided that includes a transceiver, a memory configured to store instructions, and one or more processors communicatively coupled with the memory and the transceiver. The one or more processors are configured to establish a control connection with a repeater to provide the repeater with control information for providing a repeater function between two or more wireless nodes, wherein the control connection with the repeater includes at least a first node and a second node, and transmit, to the repeater, the control information for providing the repeater function.

In another example, an apparatus for wireless communication is provided that includes means for establishing a control connection with at least a first node and a second node for receiving control information for providing a repeater function between two or more wireless nodes, means for receiving the control information over the control connection from one or more of at least the first node or the second node, and means for providing, based on the control information, the repeater function between the two or more wireless nodes.

In another example, an apparatus for wireless communication is provided that includes means for establishing a control connection with a repeater to provide the repeater with control information for providing a repeater function between two or more wireless nodes, wherein the control connection with the repeater includes at least a first node and a second node, and means for transmitting, to the repeater, the control information for providing the repeater function.

In another example, a computer-readable medium including code executable by one or more processors for wireless communications at a repeater is provided. The code includes code for establishing a control connection with at least a first node and a second node for receiving control information for providing a repeater function between two or more wireless nodes, receiving the control information over the control connection from one or more of at least the first node or the second node, and providing, based on the control information, the repeater function between the two or more wireless nodes.

In another example, a computer-readable medium including code executable by one or more processors for wireless communications at an upstream node is provided. The code includes code for establishing a control connection with a repeater to provide the repeater with control information for providing a repeater function between two or more wireless nodes, wherein the control connection with the repeater includes at least a first node and a second node, and transmitting, to the repeater, the control information for providing the repeater function.

According to an example, a method for wireless communication at a repeater is provided that includes establishing a control connection with at least a first node for receiving control information for providing a repeater function for one or more upstream nodes, receiving the control information over the control connection, determining a conflict in receiving the control information or a conflict within the control information for two or more upstream nodes, and providing, based on the control information and based on the conflict, the repeater function for the one or more upstream nodes.

In another example, a method for wireless communication at an upstream node is provided that includes establishing a control connection with a repeater or one or more other nodes having a control connection with the repeater, to provide control information for providing a repeater function for one or more upstream nodes, determining the control information for the repeater based on information of the one or more other nodes, and transmitting, to at least one of the repeater or the one or more other nodes, the control information for providing the repeater function.

In another example, an apparatus for wireless communication is provided that includes a transceiver, a memory configured to store instructions, a mobile termination unit, a repeater unit, and one or more processors communicatively coupled with the memory and the transceiver. The one or more processors are configured to establish a control connection with at least a first node for receiving control information for providing a repeater function for one or more upstream nodes, receive control information over the control connection, determine a conflict in receiving the control information or a conflict within the control information for two or more upstream nodes, and provide, based on the control information and based on the conflict, the repeater function for the one or more upstream nodes.

In another example, an apparatus for wireless communication is provided that includes a transceiver, a memory configured to store instructions, and one or more processors communicatively coupled with the memory and the transceiver. The one or more processors are configured to establish a control connection with a repeater or one or more other nodes having a control connection with the repeater, to provide control information for providing a repeater function for one or more upstream nodes, determine the control information for the repeater based on information of the one or more other nodes, and transmit, to at least one of the repeater or the one or more other nodes, the control information for providing the repeater function.

In another example, an apparatus for wireless communication is provided that includes means for establishing a control connection with at least a first node for receiving control information for providing a repeater function for one or more upstream nodes, means for receiving control information over the control connection, means for determining a conflict in receiving the control information or a conflict within the control information for two or more upstream nodes, and means for providing, based on the control information and based on the conflict, the repeater function for the one or more upstream nodes.

In another example, an apparatus for wireless communication is provided that includes means for establishing a control connection with a repeater or one or more other nodes having a control connection with the repeater, to provide control information for providing a repeater function for one or more upstream nodes, means for determining the control information for the repeater based on information of the one or more other nodes, and means for transmitting, to at least one of the repeater or the one or more other nodes, the control information for providing the repeater function.

In another example, a computer-readable medium including code executable by one or more processors for wireless communications at a repeater is provided. The code includes code for establishing a control connection with at least a first node for receiving control information for providing a repeater function for one or more upstream nodes, receiving control information over the control connection, determining a conflict in receiving the control information or a conflict within the control information for two or more upstream nodes, and providing, based on the control information and based on the conflict, the repeater function for the one or more upstream nodes.

In another example, a computer-readable medium including code executable by one or more processors for wireless communications at an upstream node is provided. The code includes code for establishing a control connection with a repeater or one or more other nodes having a control connection with the repeater, to provide control information for providing a repeater function for one or more upstream nodes, determining the control information for the repeater based on information of the one or more other nodes, and transmitting, to at least one of the repeater or the one or more other nodes, the control information for providing the repeater function To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
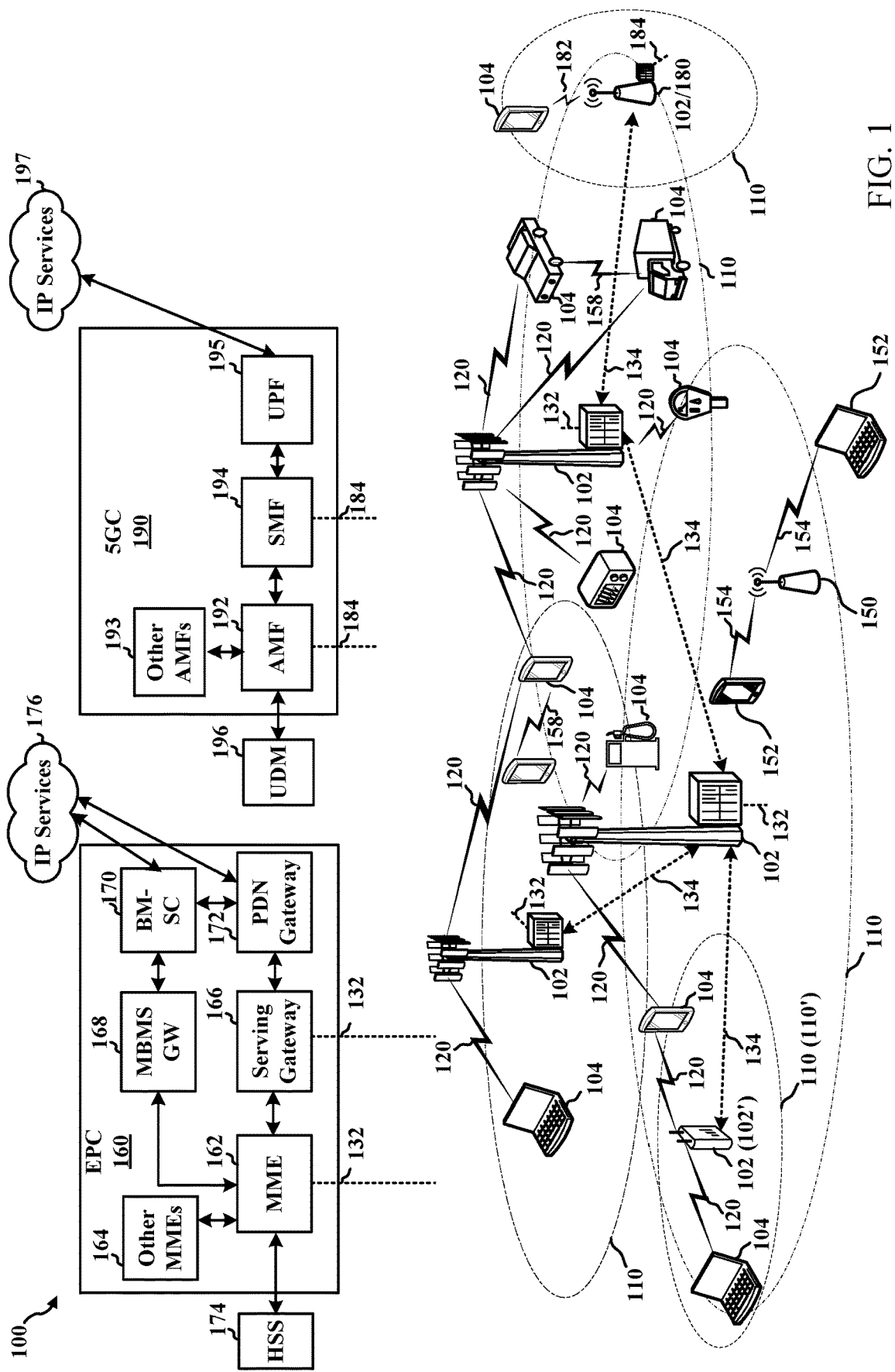
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to enabling repeaters to communicate with multiple upstream nodes, whether for control information or to provide the repeater function. For example, a repeater can be configured to connect to one or more upstream nodes to receive control information for operating the repeater, connect to one or more upstream nodes to receive downlink communications for forwarding to one or more downstream nodes and/or for forwarding uplink communications from the one or more downstream nodes to the one or more upstream nodes, etc. In addition, the repeater can accordingly be configured to resolve conflicts in control information received from one or multiple upstream nodes, resolve conflicts in communication direction configuration or beamforming configuration received from one or multiple upstream nodes, etc. In other examples, upstream nodes can coordinate with one another to avoid providing conflicting control information, communication direction configuration, beamforming configuration, etc. to the repeater.

In some wireless communication technologies, such as fifth generation (5G) new radio (NR), an amplify-forward repeater can be used that can operate in full-duplex mode with some control from an upstream node. For example, the upstream node can include one or more of a gNB, an upstream integrated access and backhaul (IAB) node, which may include a centralized unit (CU) or distributed unit (DU), etc. An JAB node, for example, may be a node that has an access node (AN) function (AN-F), or a DU, and a UE function (UE-F), or a mobile termination (MT). For example, the AN-F/DU can facilitate transmitting downlink communications to, or receiving uplink communications from, one or more downstream nodes (e.g., one or more other JAB nodes, user equipment (UEs), repeaters, etc.). In addition, for example, the UE-F/MT can facilitate transmitting uplink communications to, or receiving downlink communications from, one or more upstream nodes (e.g., one or more other JAB nodes, repeaters, base stations, etc.). A CU can be a gNB, JAB donor node, or other node that can communicate with multiple downstream DUs, where the downstream DUs can also be gNBs, IAB nodes, etc., to facilitate communicating with user equipment (UEs) connected to the DUs. Given a set of one or more gNBs, IAB nodes, CUs, DUs, etc., one or more repeaters can be used to receive and forward communications with one or more UEs, other repeaters, or other IAB nodes, to improve wireless network coverage.

In an example, an amplify-forward repeater can efficiently use available resources by operating in full duplex, which can potentially increase the system capacity, as compared to a decode-forward repeater. In addition, for example, when operating in full duplex, the amplify-forward repeater can experience or exhibit less forwarding latency (e.g., no extra latency for further intermediate frequency (IF)/baseband frequency (BB) processing, and no extra latency due to half-duplex operation), as compared to a decode-forward repeater, etc. An amplify-forward repeater, however, may also amplify unwanted signals (e.g., noise and interference) along with the wanted signal, which may result in reduction of overall effective signal-to-interference-and-noise ratio (SINR).

In an example, an amplify-forward repeater, which can also be referred to as a Layer 1 (L1) millimeter wave (MMW) repeater, can perform at least one or more of the following operations: receive analog signals on its receive (RX) antennas (e.g., based on some configured RX beamforming), amplify the power of the received analog signal, transmit the amplified signal from its transmit (TX) antennas (e.g., based on some configured TX beamforming), and/or communicate some control information with an upstream node or a server (e.g., serving base station or gNB, CU, DU, IAB node, etc.) via a control connection with the upstream node and/or one or more other upstream nodes. The repeater can use the control information to configure certain aspects of the repeater function, such as communication direction in a time period (e.g., uplink, downlink, etc. per symbol or slot), a beam to use in communicating during a time period, and/or the like.

Aspects described herein relate to enabling the repeater to communicate with multiple upstream nodes, whether for the control connection or in providing the repeater function. This can allow for expanding use of the repeater to multiple upstream nodes, multiple cells, potentially multiple network operators, etc. In addition, aspects are described herein as generally related to amplify-forward type of repeaters, though aspects can be similarly used by other types of repeaters to provide the functions described herein.

The described features will be presented in more detail below with reference to FIGS. 1-18.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN)

area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
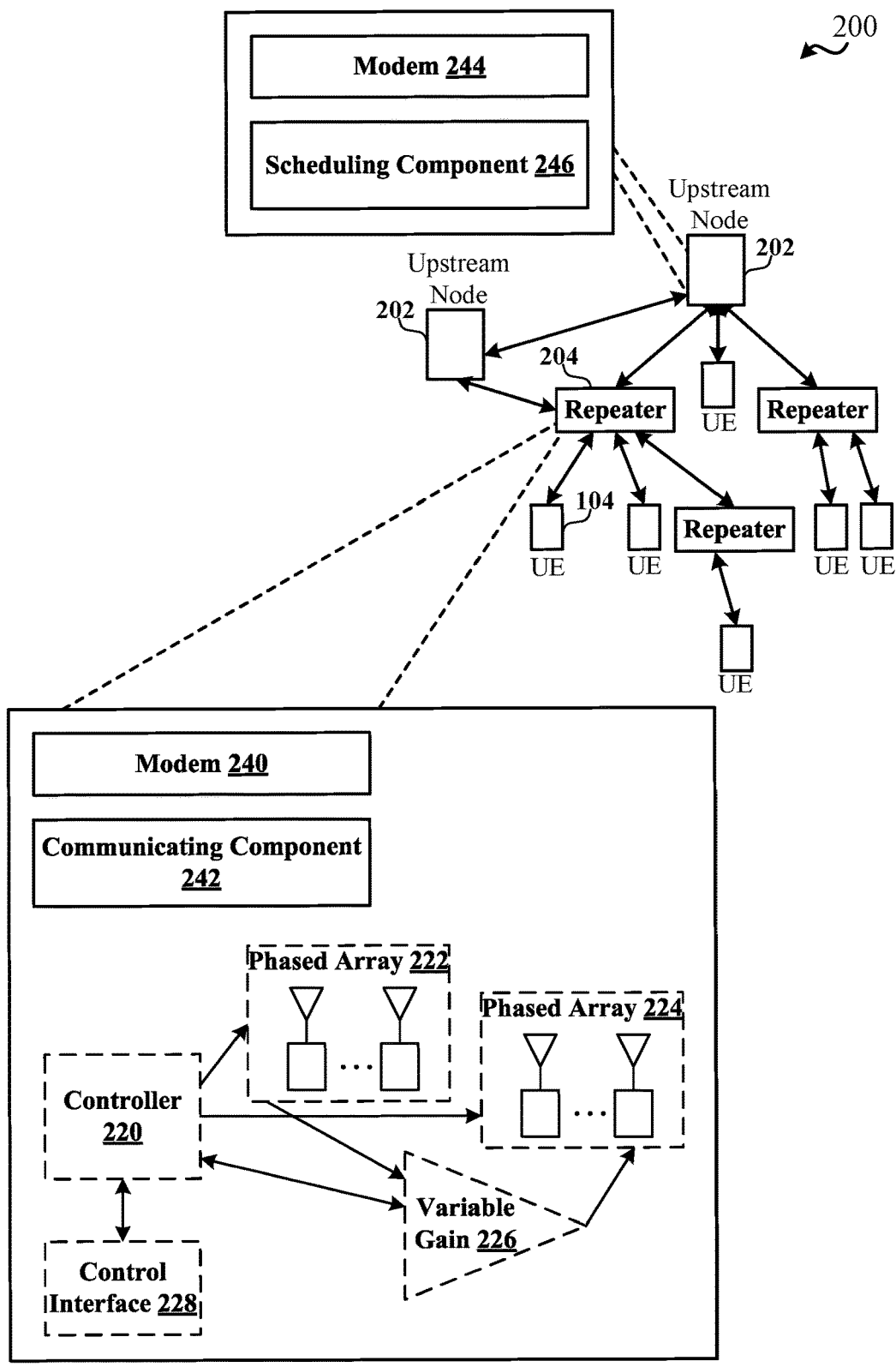
FIG. 2 illustrates an example of a wireless communication system that provides repeaters for facilitating communications between base stations and user equipment, in accordance with various aspects of the present disclosure.

In an example, base stations 102 can communicate with UEs 104 via one or more repeaters, as described further in reference to FIG. 2. Repeaters can include one or more of a class A repeater, a class B repeater, or a class C repeater, which can have varying levels of control by the base station 102 or other network components, as described.

Referring to FIG. 2, in accordance with various aspects described herein, an example of another wireless communication access network 200 that uses repeaters is depicted. The wireless communication access network 200 can include one or more upstream nodes 202, which can include a gNB or other base station, IAB node, CU, DU, etc. that can communicate with one or more UEs 104 and/or repeaters 204. The repeaters can be positioned between the one or more upstream nodes 202 (and/or one or more intermediate upstream repeaters) and a UE 104 (and/or one or more intermediate downstream repeaters). An upstream node can also be referred to herein as a control node, as it can control the repeater 204 to provide the repeater function, as described herein. In an example, the repeaters 204 can be amplify-forward type repeaters that allow some control by the one or more upstream nodes 202 (e.g., for beamforming, uplink/downlink communication direction indication, etc.), and can provide an amplify-forward functionality for communications to/from a UE 104. In addition, in an example, the repeaters 204 may operate in half duplex or full duplex.

In an example, a repeater 204 can optionally include components for amplifying and forwarding transmissions and for transmitting control data to and/or receiving control data from other nodes, such as one or more upstream nodes 202. For example, repeater 204 can include a controller 220 that can control one or more phased arrays 222, 224 (e.g., arrays of antennas) or a variable gain function 226 for amplifying received signals. For example, repeater 204 can receive signals from an upstream node 202, a UE 104, or another upstream or downstream node (e.g., another repeater) via phased array 222. The repeater 204 can amplify the received signals via variable gain 226 and can transmit the signals to a UE 104, upstream node 202, or another downstream or upstream node (e.g., another repeater) via the same phased array 222 or another phased array 224. In an example, repeater 204 can communicate in full duplex by concurrently receiving signals via phased array 222 and transmitting signals via phased array 224. In addition, control interface 228 can communicate control information to one or more upstream nodes 202 and/or a UE 104 (e.g., via a modem 240 and/or communicating component 242, as described further herein) and/or can receive control information from the one or more upstream nodes 202 and/or the UE 104.

In a specific example, as described herein, communicating component 242 of a repeater 204 can communicate with multiple upstream nodes 202 over a control connection and/or multiple upstream nodes 202 to provide repeater function for the multiple upstream nodes 202. In an example, the set of one or more upstream nodes 202 that provide the control connection can be the same as or different than the set of one or more upstream nodes 202 for which the repeater 204 is configured to provide the repeater function. Scheduling component 246 (e.g., via modem 244) can configure one or more repeaters 204 with the control information for providing the repeater function (e.g., for upstream node 202 having the scheduling component 246 or otherwise) or can configure the one or more repeaters 204 with resources over which to communicate to provide the repeater function, as described further herein.

Additionally, for example, the upstream node 202, repeater 204, and/or UE 104 can each be capable of beamforming antenna resources to transmit beams to, and/or receive beams from, one another. Beamforming antenna resources can include selectively applying power to the antenna resources to achieve a spatial directionality for the antenna resources, which can be used to transmit or receive signals. Beamforming, in this regard, can optimize communications between the nodes. In an example, nodes can provide feedback to one another regarding which of multiple possible beams should be used or are desired to be used. For example, the nodes can perform a beam management procedure (e.g., beam training) where multiple beams can be transmitted by one node (e.g., the upstream node 202) and measured by other nodes (e.g., the repeater 204 and/or UE 104) to determine which beam is optimal. The other nodes can indicate the desired beam to the one node, and the one node can transmit and/or receive based on the beam. The other nodes can receive and/or transmit based on a reciprocal beam.

In one example, in a downlink (DL) operation, repeater 204 can receive an analog signal from an upstream node 202 (e.g., an intermediate (higher-tier) repeater, an upstream IAB node, gNB, CU, DU, etc.) using an RX beam, then amplify and forward the signal on a TX beam towards the UE or another downstream node (e.g., a lower-tier repeater, a downstream IAB node, gNB, CU, DU, etc.). In an uplink (UL) operation, for example, repeater 204 can receive an analog signal from a UE 104 or a downstream repeater (e.g., an intermediate (lower-tier) repeater) on an RX beam, then amplify and forward the signal on a TX beam towards the upstream node 202 or another upstream repeater (e.g., a higher-tier repeater).

Figure 3:
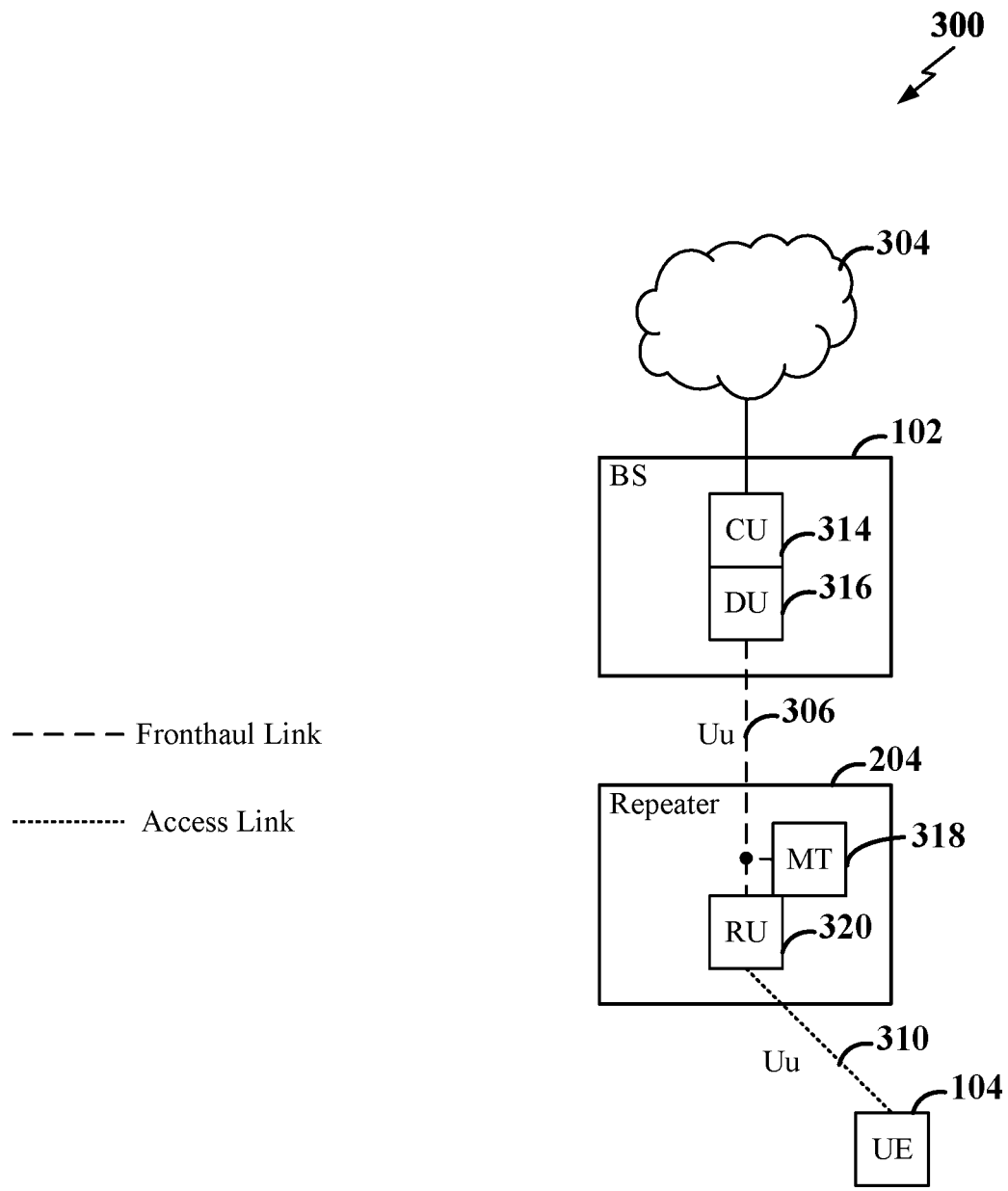
FIG. 3 is a diagram illustrating an example of a repeater device in a wireless communication system, in accordance with various aspects of the present disclosure.

In some wireless communication networks, the functionality of the base stations and/or other components of the network may be distributed across multiple entities. FIG. 3 illustrates an example of a wireless communication network 300 that may be utilized in some aspects of the disclosure. In this example, a network entity such as a base station (BS) 102 is coupled to a remote network 304, such as a main backhaul network or mobile core network. In the wireless communication network 300, wireless spectrum may be used for a fronthaul (FH) link 306 between the base station 102 (or other upstream node) and a repeater 204, and for an access link 310 between the repeater 204 and a UE 104 (or other downstream node). The FH link 306 and the access link 310 may each be conducted over a Uu radio interface or some other suitable wireless communication interface. In some examples, the wireless spectrum may utilize mmW frequencies and/or sub-6 GHz carrier frequencies.

The wireless communication network 300 may include other base stations, UEs, or repeaters (not shown). In the example of FIG. 3, the base station 102 may be referred to as a donor node since the base station 102 provides a communication link to the remote network 304. A donor node may include, for example, a wired (e.g., fiber, coaxial cable, Ethernet, copper wires), microwave, or another suitable link to the remote network 304.

The base station 102 may be an enhanced gNB including functionality for controlling the wireless communication network 300. In some examples (e.g., as shown in FIG. 3), the base station 102 may include a central unit (CU) 314 and one or more distributed units (DUs) 316. The CU 314 is configured to operate as a centralized network node (or central entity) within the wireless communication network 300. For example, the CU 314 may include radio resource control (RRC) layer functionality and packet data convergence protocol (PDCP) layer functionality to control/configure the other nodes (e.g., repeaters or UEs) within the network 300. In some aspects, RRC signaling may be used for various functions including, as one example, setting up and releasing user data bears. In some examples, RRC signaling messages may be transported over signaling bearers (e.g., signaling radio bearer (SRB) 1 and SRB 2).

The DU 316 can be configured to operate as a scheduling entity to schedule scheduled entities (e.g., repeaters or UEs) of the base station 102. For example, the DU 316 may operate as a scheduling entity to schedule the repeater 204 and the UE 104. In some examples, the DU 316 may include radio link control (RLC), medium access control (MAC), and physical (PHY) layer functionality to enable operation as a scheduling entity.

An F1 interface provides a mechanism to interconnect the CU 314 (e.g., PDCP layer and higher layers) and the DU 316 (e.g., RLC layer and lower layers). In some aspects, an F1 interface may provide control plane and user plane functions (e.g., interface management, system information management, UE context management, RRC message transfer, etc.). F1AP is an application protocol for F1 that defines signaling procedures for F1 in some examples. The F1 interfaces support F1-C on the control plane and F1-U on the user plane.

To facilitate wireless communication between the base station 102 and the UEs (e.g., the UE 104) served by the base station 102, the repeater 204 may be configured to operate as a scheduled entity. The repeater 204 may include a mobile termination (MT) unit 318 to enable scheduled entity functionality. For example, the MT unit 318 may include UE functionality to connect to the base station 102 and to be scheduled by the base station 102. The repeater 204 also includes a repeating unit (RU) 320 that relays signals between the base station 102 and the UE 104. A RU may also be referred to as a relay unit, a remote unit, and the like.

Figure 4:
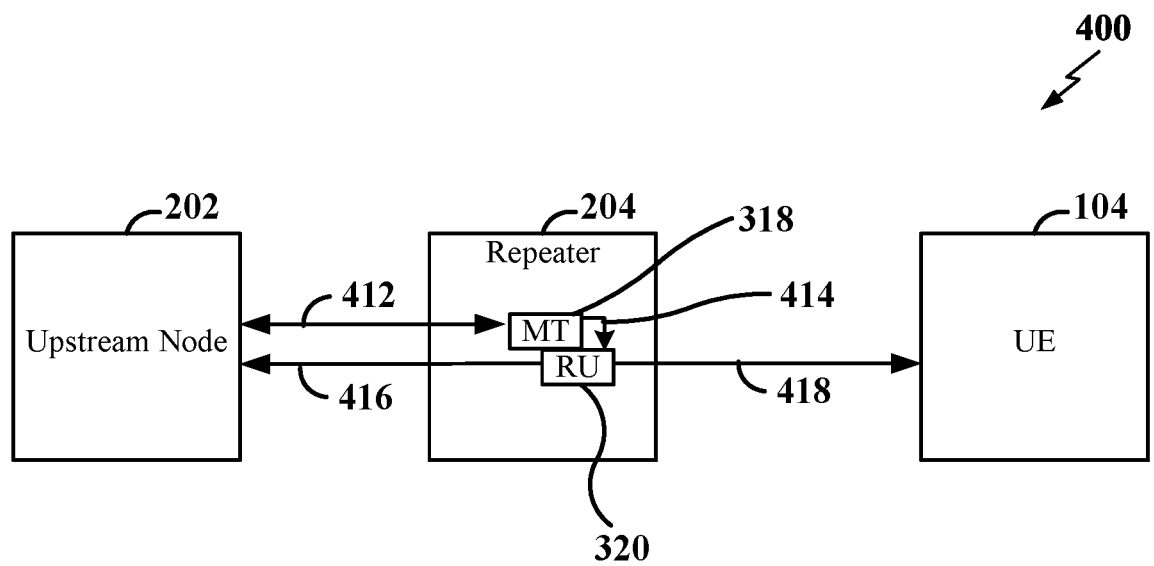
FIG. 4 is a block diagram illustrating example components and communication links of a repeater device, in accordance with various aspects of the present disclosure.

FIG. 4 illustrates an example of a wireless communication network 400 including an upstream node 202, a repeater 204, and a UE 104. The upstream node 202 may correspond to a gNB or other base station, CU or DU thereof, IAB node, etc., as described herein. In addition, the UE 104 may be a UE 104 or other downstream node that is immediately downstream of the repeater 204. Millimeter wave communications have a higher frequency and shorter wavelength than other types of radio waves used for communications (e.g., sub-6 GHz communications). Consequently, millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station that communicates using the sub-6 GHz radio waves. However, a millimeter wave might not be capable of penetrating the same wall (e.g., depending on a thickness of the wall, a material from which the wall is constructed, and/or the like). Thus, a repeater device may be used to increase the coverage area of a base station, to extend coverage to UEs without line of sight to the base station (e.g., due to an obstruction), and/or the like.

For example, an obstruction between a UE and a base station or other upstream node may block or otherwise reduce the quality of a link between the base station and the UE. However, a repeater device may be placed so that there are no obstructions or fewer obstructions between the repeater device and the UE and between the repeater device and the base station. Thus, communications between the base station and the UE via the repeater device may have a higher quality than communications directly between the base station the UE.

In some examples, a repeater device may perform directional communication by using beamforming to communicate with the base station via a first beam pair (e.g., a fronthaul beam pair) and to communicate with a UE via a second beam pair (e.g., an access beam pair). The term "beam pair" may refer to a transmit (Tx) beam used by a first device for transmission and a receive (Rx) beam used by a second device for reception of information transmitted by the first device via the Tx beam.

Referring to FIG. 4, the repeater 204 includes a MT unit 318 and a RU 320. The MT unit 318 communicates with the upstream node 202 via a FH link 416. In some examples, the FH link 416 may implement a reduced functionality Uu interface that may be modified to support repeater device functionality. The FH link 416 may provide a control path 412 between the MT unit 318 and the upstream node 202 (e.g., a DU in the base station 102, not shown). In some examples, the control path 412 carries UL and DL signals to configure the repeater 204. The control path 412 may be implemented using a relatively small bandwidth part (BWP) that is in-band with the BWPs allocated for UL transmission and/or DL transmission between the upstream node 202 and the UE 104. In some examples, the FH link 416 may operate within the FR2 frequency range, as defined by 5G NR.

The RU 320 can provide the repeater function (e.g., relaying, reception, amplification, and transmission) to enable signals from the upstream node 202 to reach the UE 104 and/or to enable signals from the UE 104 to reach the upstream node 202. In some examples, the RU 320 may be an analog pass-through device (e.g., without store and forward capability). In other examples, the RU 320 may include store and forward functionality. Signals to and from the upstream node 202 are carried over a data path of the FH link 416 and an access link 418. The access link 418 provides a data path that carries analog UL signals and DL signals to and from the UE 104. In some examples, the access link 418 may operate at the FR2 frequency range.

The RU 320 and the access link 418 may be controlled by the upstream node 202 (e.g., by a DU in the base station 102, not shown). For example, the upstream node 202 may schedule UL transmissions and DL transmissions on the access link 418 (e.g., by transmitting control information to the UE 104). In addition, the upstream node 202 may control the operation of the RU through the MT unit 318. For example, the upstream node 202 may configure the MT unit 318 via the control path described above to cause the MT unit 318 to configure the RU 320. To this end, the MT unit 318 may generate control signaling carried by a signal path 414 for controlling the operation of the RU 320.

Figure 5:
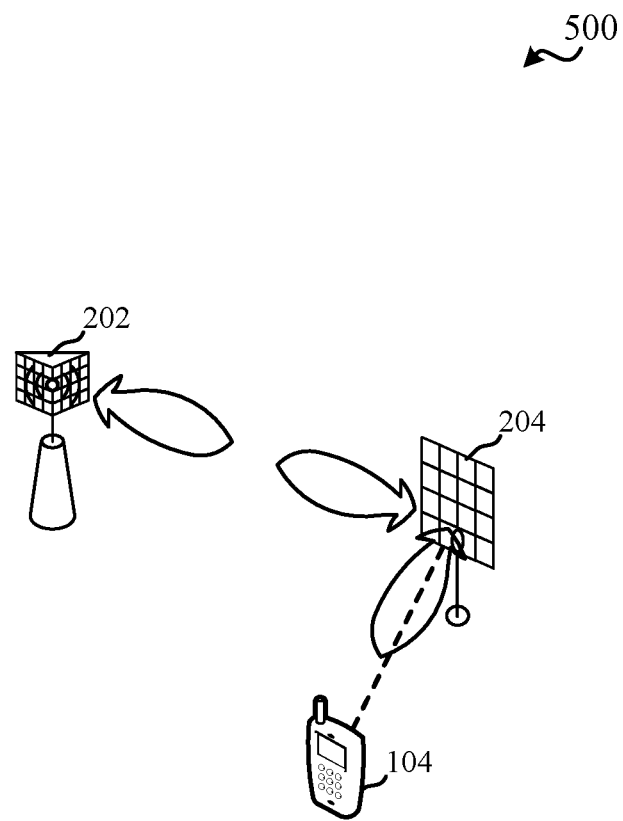
FIG. 5 illustrates an example of a wireless communication network for communicating between an upstream node and a user equipment (UE) or other downstream node using a repeater, in accordance with various aspects of the present disclosure.

FIG. 5 illustrates an example of a wireless communication network 500 for communicating between an upstream node 202 and a UE 104 (or other downstream node) using a repeater 204. The upstream node 202 can include a gNB, cell, TRP, etc. In another example, the upstream node 202 can include multiple cells of a given gNB. Where the repeater 204 is connected to a single gNB, cell, or TRP, for example, the MT unit of the repeater 204 can be single connected to the gNB, cell or TRP (e.g., the MT unit of the repeater 204 may be camping on one cell, with no carrier aggregation (CA) or dual connectivity (DC), etc.). In this example, repeater 204 can receive control information and/or configuration from the upstream node 202 in downlink control information (DCI), media access control (MAC)-control element (CE), radio resource control (RRC), or other signaling, which can include receiving control message from a single source/single beam. In addition, in this example, the repeater 204 can be configured with a single search space (e.g., in control information from the upstream node 202) for searching control information, and/or can be configured with a single radio network temporary identifier (RNTI) to receive repeater configuration commands from the upstream node 202 and/or other upstream nodes. Moreover, in this example, repeater 204 may use one serving beam on its FH, one time domain duplexing (TDD) pattern for providing repeater function to/from the upstream node 202, one beam pattern on the access link to UE 104, etc. For example, the TDD pattern, as described herein, can relate to a pattern for communication direction (e.g., uplink (UL), downlink (DL), flexible (F) direction) over multiple time periods or a pattern for beamforming information (also referred to separately as a beam pattern) over the multiple time periods. The multiple time periods may include multiple symbols, such as orthogonal frequency division multiplexing (OFDM) symbols, multiple slots where each slot includes multiple symbols in time, etc. In this configuration, no conflict may be expected in the control information received from a single gNB, cell or TRP.

In another example, however, the upstream node 202 can include multiple collocated cells of a given gNB, which may be cells at the same gNB or corresponding TRP that operate on different frequency bands (e.g., frequency 1 (F1) and frequency 2 (F2) for collocated two cells). In one such example, the MT unit of the repeater 204 can be single connected to one cell of the gNB (e.g., the MT unit of the repeater 204 may be camping on one cell, with no CA or DC, etc.). In this example, repeater 204 can receive control information and/or configuration from the cell in DCI, MAC-CE, RRC, etc., which can include receiving control message from a single source/single beam. In addition, in this example, the repeater 204 can be configured with a single search space (e.g., in control information from the cell) for searching control information, and/or can be configured with a single RNTI to receive repeater configuration commands from the cell for communicating therewith and/or with the other cell or other upstream nodes. Moreover, in this example, repeater 204 may use one serving beam on its FH.

In this example, repeater 204 may receive one TDD pattern for providing repeater function to/from the multiple cells of upstream node 202. This TDD pattern may be an aligned TDD common or dedicated configuration (e.g., TDD-TL-DL-ConfigCommon or TDD-UL-DL-ConfigDedicated, as defined in 5G NR). In this example, the TDD pattern can be a pattern specifically created for the repeater 204, which is a combination of the two cells' patterns. The two cells' patterns may be indicated in the form of TDD-UL-DL-ConfigDedicated or a new separate TDD pattern (to govern repeating operation). In another example, repeater 204 may receive multiple TDD patterns, which may include a TDD pattern for each collocated cell (e.g., per cell identifier, general index, which may be associated with one of the cells, etc.). Similarly, in this example, repeater 204 may receive one beam pattern to use on the access link to UE 104 and/or the fronthaul link towards one or multiple upstream nodes, or may receive multiple beam patterns including a beam pattern for each collocated cell (e.g., per cell identifier, general index, which may be associated with one of the cells, etc.).

Additionally, in this example, multiplexing can be configured for providing the repeater function for the multiple collocated cells. For example, the repeater 204 can be configured to use frequency division multiplexing (FDM) for simultaneous and/or transparent multiplexing of communications for each of the multiple collocated cells. In this example, the repeater 204 can provide the repeater function for each cell on a different frequency band. In another example, the repeater 204 can be configured to use time division multiplexing (TDM) to provide multiplexing of repeater function communications for the multiple collocated cells. In this example, the repeater 204 can use TDM in a transparent way based on implementation of the repeater 204 to select one of the cells for which to perform a repeater function in each time period (e.g., in each symbol or slot).

As described, for a given cell, the repeater function can include one or more of receiving a downlink signal from the cell and forwarding the downlink signal to the UE 104 or receiving an uplink signal from the UE 104 and forwarding the uplink signal to the cell. In another example, the repeater 204 can be configured to use TDM as dynamically indexed in the control information, such that the control information from the cell (e.g., received in DCI) can indicate the cell for which to perform the repeater function, a communication direction, beamforming information, etc., and the repeater 204 can accordingly perform the repeater function for the cell. In yet another example, the repeater 204 can be configured to use TDM as indicated in a semi-statically provided TDM pattern (e.g., in RRC signaling), where the TDM pattern can indicate the cell for which to perform the repeater function, a communication direction, beamforming information, etc. In this configuration, no conflict may be expected in the control information received from the collocated cells of an upstream node.

In another example where the upstream node 202 can include multiple collocated cells of a given gNB, which may operate on different frequency bands (e.g., frequency 1 (F1) and frequency 2 (F2) for collocated two cells), the MT unit of the repeater 204 can be single connected to one cell of the gNB or camping on multiple cells of the gNB in CA. In this example, repeater 204 can receive control information and/or configuration from multiple collocated cells in DCI, which can include receiving control messages from the multiple cells based on a single or multiple beams. In one example, a primary cell can transmit the control information and CA may be supported with another cell for improved FH performance and/or beam measurements. Moreover, in this example, repeater 204 may use one serving beam on its FH.

In this example, repeater 204 may receive multiple TDD patterns for providing repeater function to/from the multiple cells of upstream node 202. The TDD patterns may be indicated as TDD common or dedicated configuration (e.g., TDD-UL-DL-ConfigCommon or TDD-UL-DL-ConfigDedicated, as defined in 5G NR), and may be conflicting or non-conflicting. In an example, the TDD patterns can be specifically created for the repeater 204, can be a combination of the two cells' patterns. The two cells' patterns may be indicated in the form of TDD-UL-DL-ConfigDedicated or a new separate TDD pattern (to govern repeating operation). Similarly, in this example, repeater 204 may receive one beam pattern to use on the access link to UE 104, or may receive multiple beam patterns including a beam pattern for each collocated cell (e.g., per cell identifier, general index, which may be associated with one of the cells, etc.).

Additionally, in this example, multiplexing can be configured for providing the repeater function for the multiple collocated cells. For example, the repeater 204 can be configured to use FDM for simultaneous and/or transparent multiplexing of communications for each of the multiple collocated cells. In this example, the repeater 204 can provide the repeater function for each cell on a different frequency band. In another example, the repeater 204 can be configured to use TDM to provide multiplexing of repeater function communications for the multiple collocated cells. In this example, the repeater 204 can use TDM in a transparent way based on implementation of the repeater 204 to select one of the cells for which to perform a repeater function in each time period (e.g., in each symbol or slot). In another example, the repeater 204 can be configured to use TDM as dynamically indexed in the control information, such that the control information from the cell (e.g., received in DCI) can indicate the cell for which to perform the repeater function, a communication direction, beamforming information, etc., and the repeater 204 can accordingly perform the repeater function for the cell. In yet another example, the repeater 204 can be configured to use TDM as indicated in a semi-statically provided TDM pattern (e.g., in RRC signaling), where the TDM pattern can indicate the cell for which to perform the repeater function, a communication direction, beamforming information, etc.

In addition, in this example, no conflict may be expected in the control information received from the collocated cells of an upstream node. In an example, the cells can communicate to avoid providing conflicting information. In another example, control information received from different cells or scheduling information received from the different cells may include conflicting information. In this example, repeater 204 can determine one or more rules for resolving the conflict, and can accordingly use the control information or determine scheduling (e.g., TDD patterns for communication direction or beamforming) based on the conflict resolution. For example, repeater 204 can prioritize information received from one cell (e.g., a primary cell), cancel conflicting information, send feedback indicating the conflict and/or resolution to one or more of the collocated cells, etc.

Figure 6:
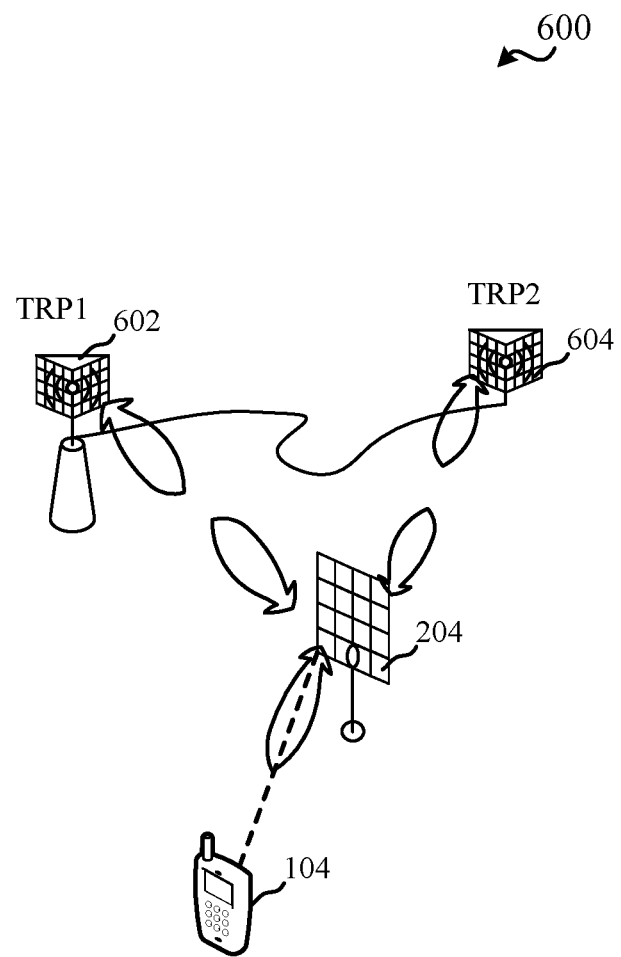
FIG. 6 illustrates an example of a wireless communication network for communicating between a first TRP of a cell of a gNB and a UE (or other downstream node) using a repeater and also between a second TRP of the same cell of the gNB and the UE (or other downstream node) using the repeater, in accordance with various aspects of the present disclosure.

FIG. 6 illustrates an example of a wireless communication network 600 for communicating between a first TRP 602 of a cell of a gNB and a UE 104 (or other downstream node) using a repeater 204 and also between a second TRP 604 of the same cell of the gNB and the UE 104 (or other downstream node) using the repeater 204. In this example, the MT unit of the repeater 204 can be single connected to the cell of the gNB via TRP 602 and/or TRP 604 (e.g., the MT unit of the repeater 204 may be camping on the one cell, with no CA or DC, etc.). In this example, repeater 204 can receive control information and/or configuration from one TRP of the cell (e.g., TRP 602 or TRP 604) in DCI, MAC-CE, RRC, etc., which can include receiving control message from a single source/single beam. In another example, repeater 204 can receive control information and/or configuration from multiple TRPs of the cell (e.g., TRP 602 and TRP 604) in DCI, MAC-CE, RRC, etc., which can include receiving control messages from multiple sources/multiple beams. Moreover, in this example, repeater 204 may use multiple serving beams on its FH (e.g., a beam for each TRP 602 and 604).

In this example, repeater 204 may receive one TDD pattern for providing repeater function to/from the multiple TRPs of upstream node 202. This TDD pattern may be an aligned TDD common or dedicated configuration (e.g., TDD-UL-DL-ConfigCommon or TDD-UL-DL-ConfigDedicated, as defined in 5G NR). In this example, the TDD pattern can be a pattern specifically created for the repeater 204, which is a combination of the two TRPs' patterns. The two TRPs' patterns may be indicated in the form of TDD-UL-DL-ConfigDedicated or a new separate TDD pattern (to govern repeating operation). In another example, repeater 204 may receive multiple TDD patterns, which may include a TDD pattern for each TRP (e.g., per TRP identifier or index, FH beam index associated with the TRP, general index, which may be associated with one of the TRPs, etc.). Similarly, in this example, repeater 204 may receive one beam pattern to use on the access link to UE 104, or may receive multiple beam patterns including a beam pattern for each TRP (e.g., per TRP identifier or index, FH beam index associated with the TRP, general index, which may be associated with one of the TRPs, etc.).

Additionally, in this example, multiplexing can be configured for providing the repeater function for the multiple TRPs. For example, the repeater 204 can be configured to use space division multiplexing (SDM) in half duplex or full duplex by using different physical or virtual antenna arrays or associated antenna elements to provide the repeater function. In another example, the repeater 204 can be configured to use TDM to provide multiplexing of repeater function communications for the multiple TRPs. In this example, the repeater 204 can use TDM between the two TRPs and using associated beams based on a semi-static or dynamic configuration of time periods such to select one of the TRPs for which to perform a repeater function in each time period (e.g., in each symbol or slot), as described. This may be used, for example, to provide load-balancing among the TRPs, to find desirable beam pair links for communications between the repeater 204 and TRPs, etc.

In addition, in this example, no conflict may be expected in the control information received from the TRPs. In an example, the gNB can avoid providing conflicting information for TRPs. In another example, control information received from different TRPs or scheduling information received from the different TRPs may include conflicting information. In this example, repeater 204 can determine one or more rules for resolving the conflict, and can accordingly use the control information or determine scheduling (e.g., TDD patterns for communication direction or beamforming) based on the conflict resolution. For example, repeater 204 can prioritize information received from one TRP, cancel conflicting information, send feedback indicating the conflict and/or resolution to the gNB via one or more of the TRPs, etc.

Figure 7:
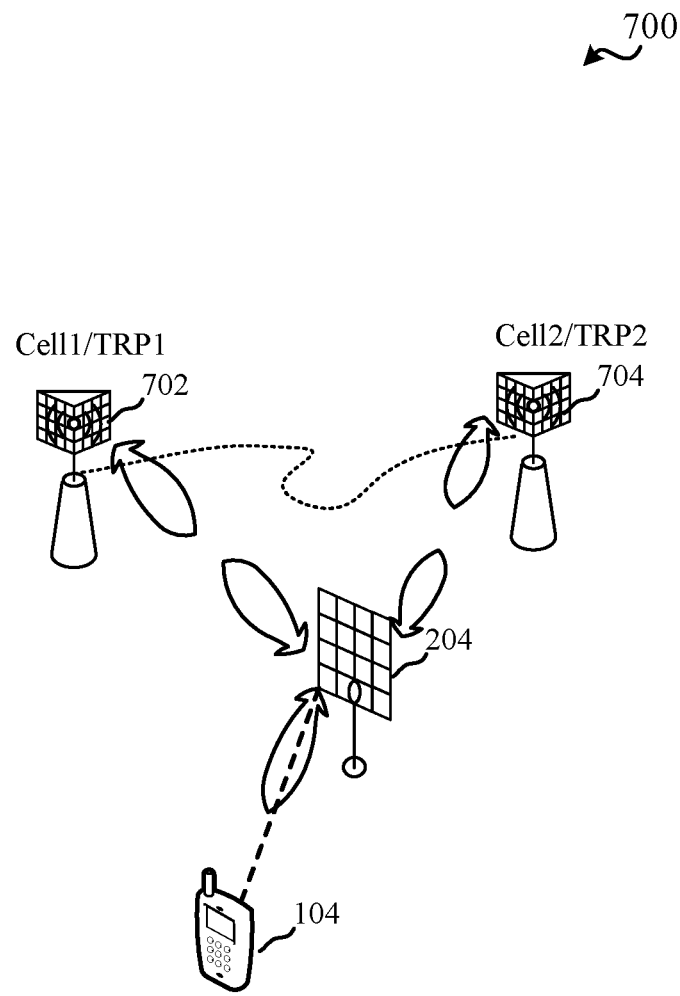
FIG. 7 illustrates an example of a wireless communication network for communicating between a first cell and a UE (or other downstream node) using a repeater and also between a second cell and the UE (or other downstream node) using the repeater, in accordance with various aspects of the present disclosure.

FIG. 7 illustrates an example of a wireless communication network 700 for communicating between a first cell 702 and a UE 104 (or other downstream node) using a repeater 204 and also between a second cell 704 and the UE 104 (or other downstream node) using the repeater 204. Thus, the cells in this example are non-collocated, and each cell may have one or more associated TRPs that communicate with the repeater 204. In one example, the MT unit of the repeater 204 can be single connected to the cell 702 or 704 (e.g., the MT unit of the repeater 204 may be camping on the one cell, with no CA or DC, etc.). In this example, repeater 204 can receive control information and/or configuration from the cell 702 or 704 in DCI, RRC, MAC-CE, etc., which can include receiving control message from a single source/single beam. Moreover, in this example, repeater 204 may use a single serving beam on its FH (e.g., a beam for the given cell 702 or 704) at least for the control information. In another example, repeater 204 may use multiple beams on its FH (e.g., a beam for each given cell 702 and 704) in performing the repeater function.

In this example, repeater 204 may receive one TDD pattern for providing repeater function to/from the multiple non-collocated cells 702 and 704. In another example, repeater 204 may receive multiple TDD patterns, which may include a TDD pattern for each cell 702 and 704 (e.g., per cell identifier or general index, which may be associated with one of the cells, etc.). Similarly, in this example, repeater 204 may receive one beam pattern to use on the access link to UE 104, or may receive multiple beam patterns including a beam pattern for each cell (e.g., per cell identifier or general index, which may be associated with one of the cells, etc.).

Additionally, in this example, multiplexing can be configured for providing the repeater function for the multiple cells. For example, the repeater 204 can be configured to use SDM in half duplex or full duplex by using different physical or virtual antenna elements to provide the repeater function. In another example, the repeater 204 can be configured to use TDM to provide multiplexing of repeater function communications for the multiple cells. In this example, the repeater 204 can use TDM between the two cells and use associated beams based on a semi-static or dynamic configuration of time periods such to select one of the cells for which to perform a repeater function in each time period (e.g., in each symbol or slot), as described. In another example, using the TDM may be transparent or not transparent to the cells, as described above. In addition, in this example, no conflict may be expected in the control information received from the cells.

In another example, the MT unit of the repeater 204 can be single connected to the cell 702 or 704, and the MT unit of the repeater 204 may be camping on multiple cells in CA (e.g., on cell 702 and 704). In this example, repeater 204 can receive control information and/or configuration from the two cells 702 and 704 in DCI, MAC-CE, RRC, etc., which can include receiving multiple control messages using multiple beams. Moreover, in this example, repeater 204 may use multiple serving beams on its FH (e.g., a beam for each cell 702 and 704).

In this example, repeater 204 may receive multiple TDD patterns for providing repeater function to/from the multiple cells 702 and 704. The TDD patterns may be indicated as TDD common or dedicated configuration (e.g., TDD-UL-DL-ConfigCommon or TDD-UL-DL-ConfigDedicated, as defined in 5G NR), and may be conflicting or non-conflicting. In another example, the TDD patterns can be specifically created for the repeater 204. In yet another example, the repeater 204 can receive a single TDD pattern that can be a combination of the two cells' patterns, which may be aligned as described further herein. Similarly, in this example, repeater 204 may receive one beam pattern to use on the access link to UE 104, or may receive multiple beam patterns including a beam pattern for each cell (e.g., per cell identifier, general index, which may be associated with one of the cells, etc.).

Additionally, in this example, multiplexing can be configured for providing the repeater function for the multiple cells 702 and 704. For example, the repeater 204 can be configured to use SDM in half duplex or full duplex by using different physical or virtual antenna arrays or associated antenna elements to provide the repeater function. In another example, the repeater 204 can be configured to use TDM to provide multiplexing of repeater function communications for the multiple cells. In this example, the repeater 204 can use TDM between the two cells and using associated beams based on a semi-static or dynamic configuration of time periods such to select one of the cells for which to perform a repeater function in each time period (e.g., in each symbol or slot), as described.

In addition, in this example, no conflict may be expected in the control information received from the cells. In an example, the cells can avoid providing conflicting information. In another example, control information received from different cells or scheduling information received from the different cells may include conflicting information. In this example, repeater 204 can determine one or more rules for resolving the conflict, and can accordingly use the control information or determine scheduling (e.g., TDD patterns for communication direction or beamforming) based on the conflict resolution. For example, repeater 204 can prioritize information received from one cell, cancel conflicting information, send feedback indicating the conflict and/or resolution to the one or more cells, etc.

Figure 8:
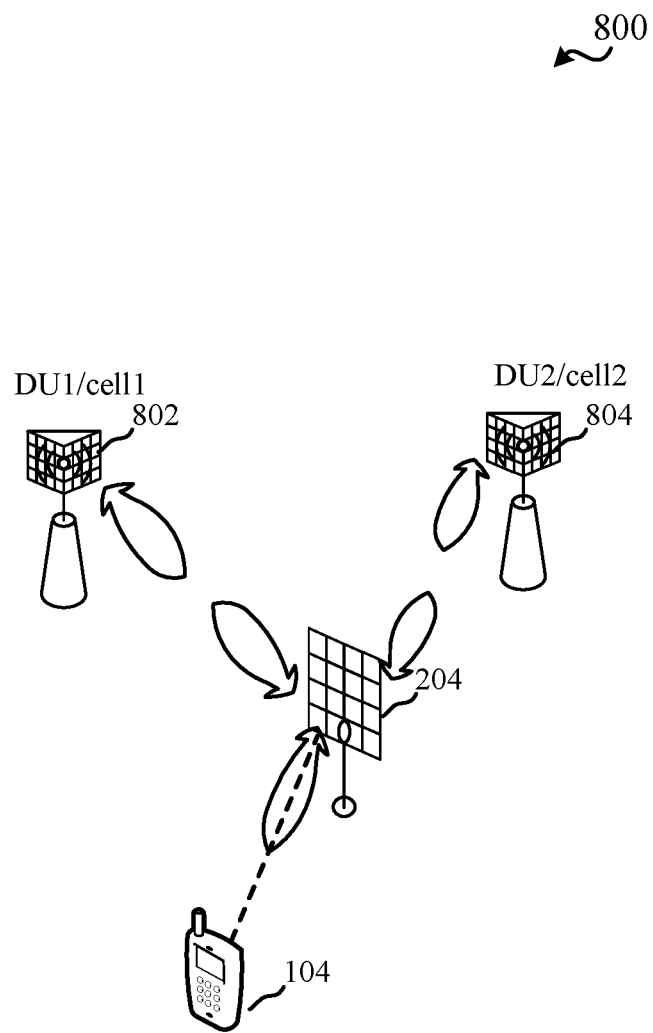
FIG. 8 illustrates an example of a wireless communication network for communicating between a first distributed unit (DU) and a UE (or other downstream node) using a repeater and also between a second DU and the UE (or other downstream node) using the repeater, in accordance with various aspects of the present disclosure.

FIG. 8 illustrates an example of a wireless communication network 800 for communicating between a first DU 802 and a UE 104 (or other downstream node) using a repeater 204 and also between a second DU 804 and the UE 104 (or other downstream node) using the repeater 204. The DUs, in this example, can each provide a cell, which in this example are non-collocated, that communicate with the repeater 204. In one example, the MT unit of the repeater 204 can be single connected to the DU 802 or 804 (e.g., the MT unit of the repeater 204 may be camping on the one cell, with no CA or DC, etc.). In this example, repeater 204 can receive control information and/or configuration from the DU 802 or 804 (or corresponding cell or TRP) in DCI, MAC-CE, RRC, etc., which can include receiving control message from a single source/single beam. In another example, repeater 204 can include multiple MTs (multi-MT), two or more of which can be connected to two or more DUs 802 and 804. In this example, the repeater 204 can receive, via the multiple MTs, control information and/or configuration from multiple DUs 802 and 804 (or corresponding cells or TRPs) in DCI, MAC-CE, RRC, etc., which can include receiving multiple control messages using multiple beams. Moreover, in this example, repeater 204 may use a single serving beam on its FH (e.g., with one DU 802 or 804). In another example, repeater 204 may use multiple serving beams on its FH (e.g., one for each MT communicating with a DU 802 or 804).

In this example, repeater 204 may receive multiple TDD patterns for providing repeater function to/from the multiple DUs 802 and 804. The TDD patterns may be indicated as TDD common or dedicated configuration (e.g., TDD-UL-DL-ConfigCommon or TDD-UL-DL-ConfigDedicated, as defined in 5G NR), and may be conflicting or non-conflicting. The TDD patterns can be per cell identifier of the DU, general index, which may be associated with one of the DUs, etc.). In another example, the TDD patterns can be specifically created for the repeater 204. In yet another example, the repeater 204 can receive a single TDD pattern that can be a combination of the two DUs' patterns, which may be aligned as described further herein. The two DUs' patterns may be indicated in the form of TDD-UL-DL-ConfigDedicated or a new separate TDD pattern (to govern repeating operation). Similarly, in this example, repeater 204 may receive one beam pattern to use on the access link to UE 104, or may receive multiple beam patterns including a beam pattern for each DU (e.g., per cell identifier, general index, which may be associated with one of the DUs, etc.).

Additionally, in this example, multiplexing can be configured for providing the repeater function for the multiple DUs. For example, the repeater 204 can be configured to use SDM in half duplex or full duplex by using different physical or virtual antenna arrays or associated antenna elements to provide the repeater function. In another example, the repeater 204 can be configured to use TDM to provide multiplexing of repeater function communications for the multiple DUs. In this example, the repeater 204 can use TDM between the two DUs and using associated beams based on a semi-static or dynamic configuration of time periods such to select one of the DUs for which to perform a repeater function in each time period (e.g., in each symbol or slot), as described.

In addition, in this example, no conflict may be expected in the control information received from the DUs. In an example, the DUs (or corresponding CUs or gNBs) can communicate with one another to avoid providing conflicting information. In another example, control information received from different DUs or scheduling information received from the different DUs may include conflicting information. In this example, repeater 204 can determine one or more rules for resolving the conflict, and can accordingly use the control information or determine scheduling (e.g., TDD patterns for communication direction or beamforming) based on the conflict resolution. For example, repeater 204 can prioritize information received from one DU, cancel conflicting information, send feedback indicating the conflict and/or resolution to the one or more DUs, etc.

Figure 9:
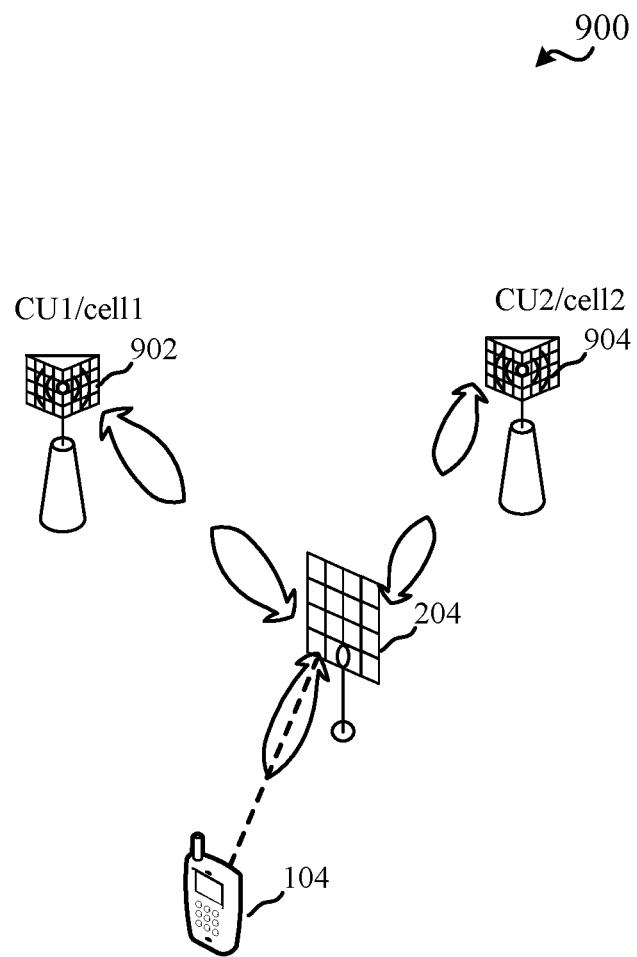
FIG. 9 illustrates an example of a wireless communication network for communicating between a first centralized unit (CU) and a UE (or other downstream node) using a repeater and also between a second CU and the UE (or other downstream node) using the repeater, in accordance with various aspects of the present disclosure.

FIG. 9 illustrates an example of a wireless communication network 900 for communicating between a first CU 902 and a UE 104 (or other downstream node) using a repeater 204 and also between a second CU 904 and the UE 104 (or other downstream node) using the repeater 204. The CUs, in this example, can each provide a cell, or can provide a DU that provides a cell, etc., which in this example are non-collocated, that communicate with the repeater 204. In an example, where the CUs correspond to gNBs that operate for the same mobile network operator, the repeater 204 can function similar as described in FIG. 8 above, and the CUs 902 and 904 can communicate to coordinate control information, scheduling information, etc. to avoid conflict.

In an example, where the multiple CUs 902 and 904 correspond to gNBs that operate for different mobile network operators (which can be referred to as radio access network (RAN) sharing), the repeater 204 can establish a control connection with both CUs 902 and 904 for corresponding control information to provide repeater function.

In this example, multiplexing can be configured for providing the repeater function for the multiple CUs. For example, the repeater 204 can be configured to use SDM in half duplex or full duplex by using different physical or virtual antenna arrays or associated antenna elements to provide the repeater function. In another example, the repeater 204 can be configured to use TDM to provide multiplexing of repeater function communications for the multiple CUs. In another example, the repeater 204 can be configured to use FDM to provide multiplexing of repeater function communications for the multiple CUs using the same or different beams.

In one example, the repeater 204 can connect to one CU (or CU cell) for receiving control information. In this example, there can be some coarse/semi-static agreement between the mobile network operators on how to use a repeater (in terms of TDD), such as how to partition TDM resources, spatial resources, or how to set a common access link beam for the repeater, etc. For example, the repeater may be agnostic to the second CU. In this example, the repeater may be configured to provide measurements (such as radio resource management (RRM) measurements) of cells that can be reported to its serving CU (e.g., to determine beamforming information, which CUs to connect to, etc.).

In another example, the repeater 204 can connect to multiple CUs 902 and 904 for receiving control information (e.g., via multiple MT units). In this example, the repeater 204 may receive dynamic control from one of the CUs 902 or 904, both CUs 902 and 904, or none of them (in case, repeater is configured with semi-static configuration and hence may not need support for dynamic (re)configuration). In this example, repeater 204 can determine one or more rules for resolving conflicts in configurations for the CUs 902 and 904, and can accordingly use the control information or determine scheduling (e.g., TDD patterns for communication direction or beamforming) based on the conflict resolution. For example, repeater 204 can prioritize information received from one CU, cancel conflicting information, send feedback indicating the conflict and/or resolution to the one or more CUs, etc.

Turning now to FIGS. 10-17, aspects are depicted with reference to one or more components and one or more methods that may perform the actions or operations described herein, where aspects in dashed line may be optional. Although the operations described below in FIG. 12-17 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 10:
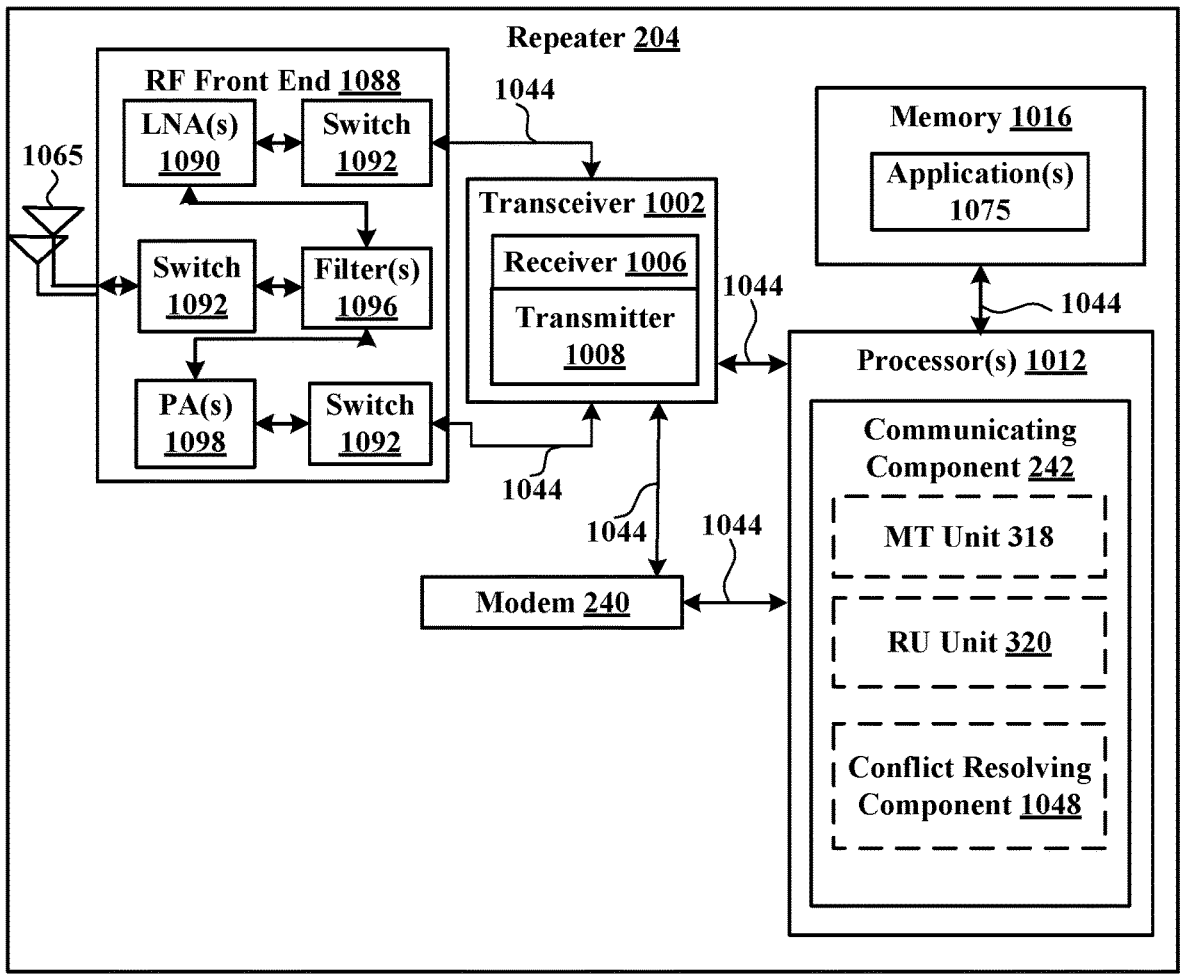
FIG. 10 is a block diagram illustrating an example of a repeater, in accordance with various aspects of the present disclosure.

Referring to FIG. 10, one example of an implementation of a repeater 204 may include a variety of components, some of which have already been described above and are described further herein, including components such as one or more processors 1012 and memory 1016 and transceiver 1002 in communication via one or more buses 1044, which may operate in conjunction with modem 240 and/or a communicating component 242 to report parameters to a base station to facilitate scheduling UEs or other downstream nodes and to facilitate communications between the base station and UEs or other downstream nodes. For example, communicating component 242 can optionally include a MT unit 318 for communicating control information with one or more upstream nodes, a RU unit 320 for providing a repeater functionality between one or more upstream nodes and one or more downstream nodes, and/or a conflict resolving component 1048 for resolving potential conflicts in received control information or other information for operating the repeater 204, such as scheduling information, communication direction, beamforming, etc.

In an aspect, the one or more processors 1012 can include a modem 240 and/or can be part of the modem 240 that uses one or more modem processors. Thus, the various functions related to communicating component 242 may be included in modem 240 and/or processors 1012 and, in an aspect, can be executed by a single processor, while in other aspects, different ones of the functions may be executed by a combination of two or more different processors. Moreover, the repeater 204 can include the other components described in reference to FIG. 2 for communicating (e.g., the controller 220, phased arrays 222, 224, variable gain function 226, etc., which may be part of RF front end 1088, the control interface 228, which may communicate via communicating component 242 to report and/or receive certain information to/from an upstream node, etc., as described further herein). For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 240 associated with communicating component 242 may be performed by transceiver 1002.

Also, memory 1016 may be configured to store data used herein and/or local versions of applications 1075 or communicating component 242 and/or one or more of its subcomponents being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining communicating component 242 and/or one or more of its subcomponents, and/or data associated therewith, when repeater 204 is operating at least one processor 1012 to execute communicating component 242 and/or one or more of its subcomponents.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by an upstream node, a downstream node, etc. Additionally, receiver 1006 may process such received signals, and also may obtain measurements of the signals, such as, but not limited to, Ec/Io, SNR, reference signal received power (RSRP), received signal strength indicator (RSSI), etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, repeater 204 may include RF front end 1088, which may operate in communication with one or more antennas 1065 and transceiver 1002 for receiving and transmitting radio transmissions, for example, wireless communications transmitted by at least one base station 102 or wireless transmissions transmitted by a UE or other downstream node. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, RF front end 1088 can use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver 1002 may be tuned to operate at specified frequencies such that repeater 204 can communicate with, for example, one or more upstream nodes (e.g., base stations 102, upstream IAB nodes, CUs, DUs, other repeaters, etc.) or one or more cells associated with one or more upstream nodes, one or more downstream nodes (e.g., UEs 104, downstream IAB nodes, other repeaters, etc.), and/or the like. In an aspect, for example, modem 240 can configure transceiver 1002 to operate at a specified frequency and power level based on a configuration of the repeater 204 and the communication protocol used by modem 240.

In an aspect, modem 240 can be a multiband-multimode modem, which can process digital data and communicate with transceiver 1002 such that the digital data is sent and received using transceiver 1002. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of repeater 204 (e.g., RF front end 1088, transceiver 1002) to enable transmission and/or reception of signals from the network or UEs, upstream nodes or downstream nodes, etc. based on a specified modem configuration. In an aspect, the modem configuration can be based on the mode of the modem and the frequency band in use. In another aspect, the modem configuration can be based on configuration information associated with repeater 204 as provided by the network during cell selection and/or cell reselection or initial access.

In an aspect, the processor(s) 1012 may correspond to one or more of the processors described in connection with the repeater 204 in FIG. 18. Similarly, the memory 1016 may correspond to the memory described in connection with the repeater 204 in FIG. 18.

Figure 11:
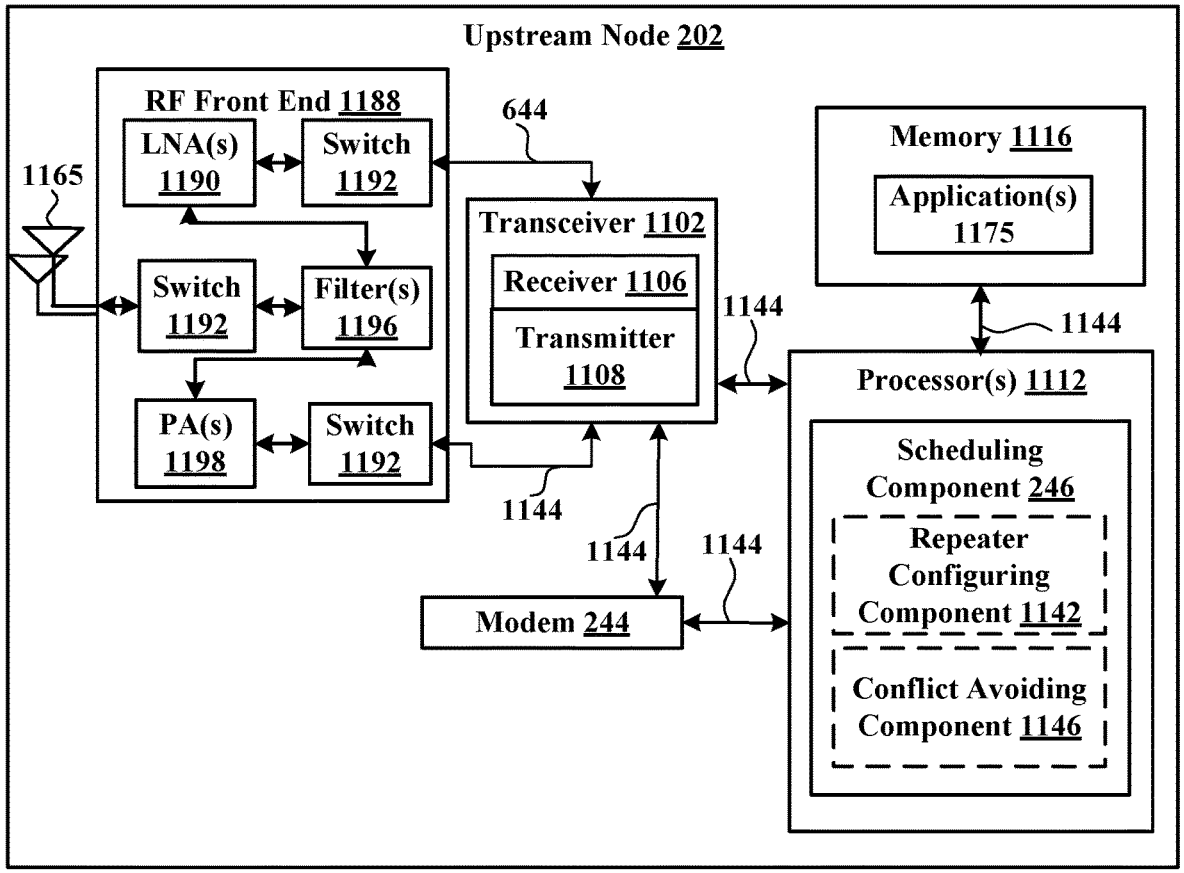
FIG. 11 is a block diagram illustrating an example of an upstream node, in accordance with various aspects of the present disclosure.

Referring to FIG. 11, one example of an implementation of an upstream node 202, which may include a gNB or other base station, IAB node, CU, DU, etc., and which may include a variety of components, some of which have already been described above, but including components such as one or more processors 1112 and memory 1116 and transceiver 1102 in communication via one or more buses 1144, which may operate in conjunction with modem 244 to provide backhaul access to a core network. In addition, the one or more processors 1112 and memory 1116 and transceiver 1102 etc. may optionally operate with a scheduling component 246 for scheduling repeaters or other downstream nodes for communication. In an example, scheduling component 246 can optionally include a repeater configuring component 1142 for configuring a repeater to provide a repeater function for the upstream node 202 or for one or more other upstream nodes, and/or a conflict avoiding component 1146 for generating a configuration for a repeater that either avoids conflict with another configuration generated for the repeater by another upstream node or avoids conflict among scheduling information, communication direction, beamforming, etc. for a repeater providing the repeater function for multiple upstream nodes.

The transceiver 1102, receiver 1106, transmitter 1108, one or more processors 1112, memory 1116, applications 1175, buses 1144, RF front end 1188, LNAs 1190, switches 1192, filters 1196, PAs 1198, and one or more antennas 1165 may be the same as or similar to the corresponding components of repeater 204, as described above, but configured or otherwise programmed for the base station 102 as opposed to repeater operations.

In an aspect, the processor(s) 1112 may correspond to one or more of the processors described in connection with the base station in FIG. 18, as described. Similarly, the memory 1116 may correspond to the memory described in connection with the base station in FIG. 18, as described.

Figure 12:
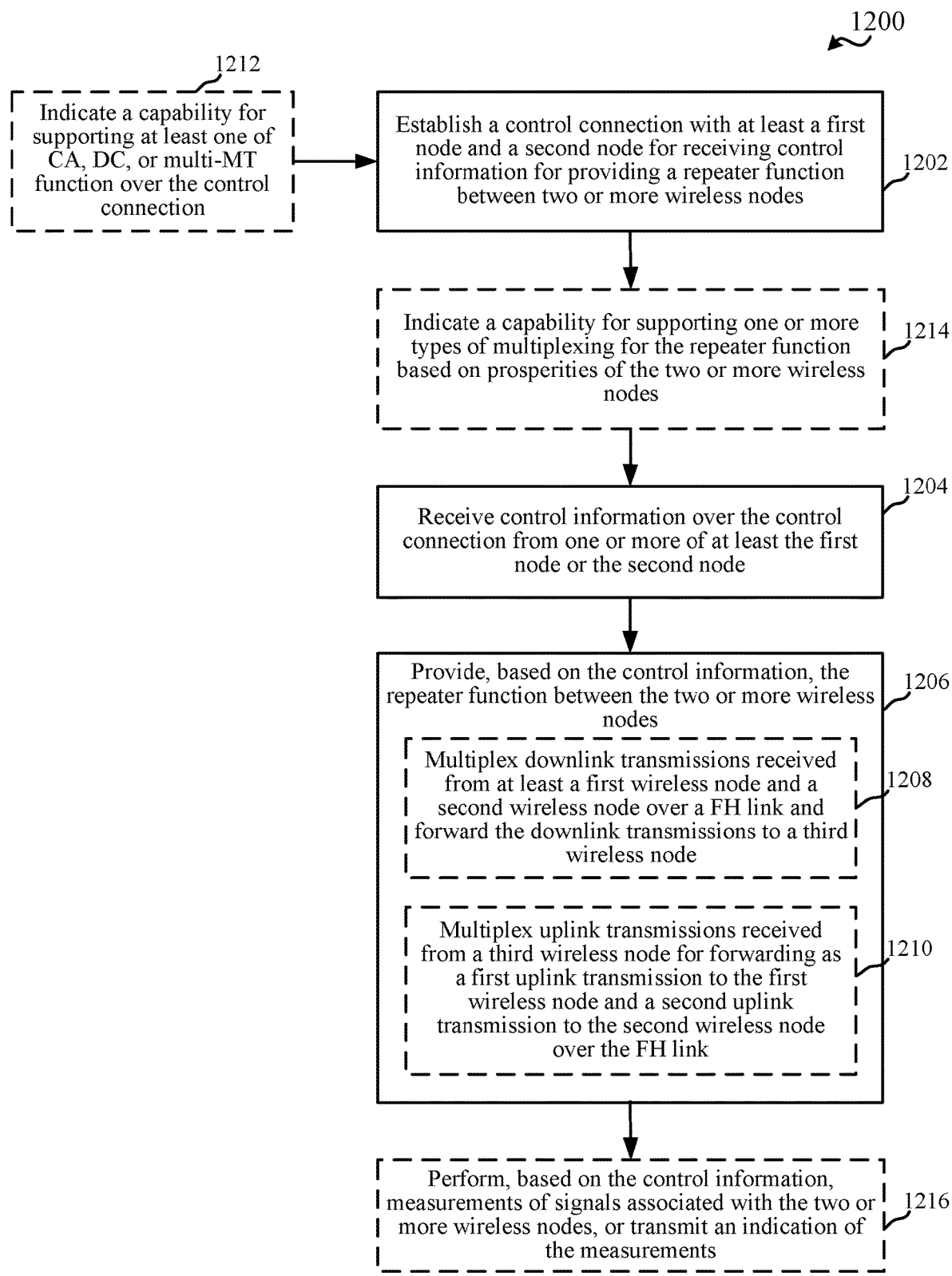
FIG. 12 illustrates a flow chart of an example of a method for providing a repeater function based on control information received from multiple nodes, in accordance with various aspects of the present disclosure.

FIG. 12 illustrates a flow chart of an example of a method 1200 for providing a repeater function based on control information received from multiple nodes. In an example, a repeater 204 can perform one or more of the functions described in method 1200 using one or more of the components described in FIGS. 2 and 10.

In method 1200, at Block 1202, a control connection with at least a first node and a second node can be established for receiving control information for providing a repeater function between two or more wireless nodes. In an aspect, MT unit 318, e.g., in conjunction with communicating component 242, processor(s) 1012, memory 1016, transceiver 1002, etc., can establish the control connection with at least the first node and the second node for receiving control information for providing a repeater function between the two or more wireless nodes. In one example, the nodes providing the control information can be the same as the nodes for which the repeater 204 is providing the repeater function. Thus, in this example, the two or more wireless nodes may include at least the first node and the second node, as well as one or more downstream nodes. In another example, the nodes providing the control information can include at least a portion of the nodes for which the repeater 204 is providing the repeater function, or can be completely different than the nodes for which the repeater 204 is providing the repeater function.

In an example, MT unit 318 can establish the connection with at least the first node and the second node as upstream nodes for receiving the control information to control the repeater function. In various configurations described above, at least the first node and the second node can include different cells of a single gNB or other base station, different TRPs of a single gNB or other base station, different cells of different gNBs or other base stations, different DUs of the same or different CU, different CUs associated with the same or a different mobile network operator, etc. In some examples, MT unit 318 can camp on multiple nodes and may receive control information from one or more of the multiple nodes. Such examples may include where at least the first node and the second node include multiple collocated cells, multiple TRPs of the same cell, multiple non-collocated cells, etc. In some examples, MT unit 318 can camp on or be connected with multiple nodes (e.g., in CA, DC, or using multiple MT units) and may receive control information from the multiple nodes. Such examples may include where at least the first node and the second node include multiple collocated cells, multiple non-collocated cells, multiple DUs, multiple CUs, etc. In some examples, as described further herein, receiving control information from multiple nodes may result in conflict in the control information. In some examples, the repeater 204 can resolve such conflicts.

In specific examples, MT unit 318 of the repeater 204 may be connected to multiple nodes or TX/RX points. In a first case, having no DC/CA, the MT unit 318 may have only a single serving cell (no DC, no CA), may be connected to multiple TRPs of the serving cell (via multiple serving beams), or may be forwarding signals associated with other cells. In a second case, having CA but no DC (e.g., having a master cell group (MCG)), the MT unit 318 can be camping on multiple cells (one primary and one or multiple secondary cells). In a third case, having DC, the MT unit 318 may be configured with both MCG and a secondary cell group (SCG). In a fourth case, the repeater 204 may have multiple MT units 318, where each MT unit can individually connect to one or multiple cells/TRPs. In this case, for example, it may be indicated to network that there are multiple collocated MT units at the repeater 204. In another example, the configurations of the multiples MTs can be shared in this regard.

In method 1200, at Block 1204, control information can be received over the control connection from one or more of at least the first or the second node. In an aspect, MT unit 318, e.g., in conjunction with communicating component 242, processor(s) 1012, memory 1016, transceiver 1002, etc., can receive the control information over the control connection from the one or more of at least the first node or the second node. Thus, in some examples, though the repeater 204 may be connected with multiple nodes for the control connection, the repeater 204 may or may not receive control information from all of the nodes. For example, repeater 204 may only receive control information from a primary cell, where connected to multiple cells (e.g., in CA). In other examples, however, repeater 204 may receive control information from multiple cells (e.g., in DC or multi-MT). In an example, the control information may include scheduling information indicating resources for operating the repeater 204, a communication direction for one or more time periods (e.g., uplink, downlink, flexible, etc. for one or more symbols, slots, etc.), beamforming information indicating a beam, transmit/receive beam pair, etc. for one or more symbols, slots, etc., and/or the like.

In an example, receiving control information for repeater configuration can include receiving the control information as DCI (e.g., using a new DCI format), MAC-CE, and/or RRC messages from at least the first node or the second node. In one example, as described above, the repeater 204 may be configured to receive repeater's configuration from only one cell (or one TRP, e.g. the primary cell). In another example, the repeater 204 It may be configured to receive repeater's configuration from multiple cells (or multiple TRPs). In yet another example, the repeater 204 may receive different configurations from different cells (TRPs)—e.g., receiving repeater-specific RRC configuration from the primary cell, while being configured to monitor for dynamic control (e.g. DCI) on multiple cells (or from multiple TRPs).

In method 1200, at Block 1206, the repeater function can be provided between the two or more wireless nodes based on the control information. In an aspect, RU unit 320, e.g., in conjunction with communicating component 242, processor(s) 1012, memory 1016, transceiver 1002, etc., can provide, based on the control information, the repeater function between the two or more wireless nodes. For example, RU unit 320 can provide the repeater function between the two or more wireless nodes including at least one of (1) receiving downlink signals from an upstream node, optionally amplifying the downlink signals, and forwarding the downlink signals to a downstream node, or (2) receiving uplink signals from a downstream node, optionally amplifying the uplink signals, and forwarding the uplink signals to an upstream node. As described, the two or more wireless nodes may include the first node and the second node with which the repeater 204 establishes the control connection or can include different nodes.

In an example, providing the repeater function may include RU unit 320 determining a beam to use for a given period of time based on beamforming information indicated in the control information (e.g., as a beam or beam pair to use, which can be indicated via a transmission configuration indicator (TCI) state or corresponding index), and using the beam for transmitting or receiving communications in the period of time. In another example, providing the repeater function may include RU unit 320 determining a communication direction for the period of time (e.g., for TDM), which may be based on the control information as well, or related received scheduling information from the nodes for which the repeater function is provided.

In providing the repeater function with multiple upstream nodes, optionally at Block 1208, downlink transmissions received from at least a first wireless node and a second wireless node over a FH link can be multiplexed, and the downlink transmission can be forwarded to a third wireless node. In an aspect, RU unit 320, e.g., in conjunction with communicating component 242, processor(s) 1012, memory 1016, transceiver 1002, etc., can multiplex the downlink transmissions received from at least the first wireless node and the second wireless nodes (e.g., as upstream nodes) and can forward the downlink transmissions to the third wireless node (e.g., as a downstream node). Similarly, optionally at Block 1210, uplink transmissions received from a third wireless node can be multiplexed for forwarding as a first uplink transmission to the first wireless node and a second uplink transmission to the second wireless node over the FH link. In an aspect, RU unit 320, e.g., in conjunction with communicating component 242, processor(s) 1012, memory 1016, transceiver 1002, etc., can multiplex the uplink transmissions received from the third wireless node for forwarding as the first uplink transmission to the first wireless node and the second uplink transmission to the second wireless node over the FH link. For example, the multiplexing can include TDM, FDM, SDM (in half duplex of full duplex), etc., as described above.

For example, for multiplexing communications of multiple cells/TRPs, the RU unit 320 can use FDM (which may be based on a single beam). In this example, if the repeater 204 can reach to two cells/TRPs using the same FH beam (e.g. if the two cells/TRPs points are collocated, or repeater uses a broad beam), the repeater 204 may simultaneously forward the communications of both cells/TRPs that are FDMed (e.g., in different frequency bands or channels). In another example, the repeater 204 may forward the wideband (FDMed) signal of one or multiple UEs. For downlink, for example, the repeater 204 may provide single-input single-output OR single-input multiple-output (split and amplify). For uplink, for example, the repeater 204 may provide single-input single-output OR multiple-input single-output (combine and forward).

In another example, for multiplexing communications of multiple cells/TRPs, the RU unit 320 can use SDM half-duplex, where the repeater 204 may be able to create multiple simultaneous FH beams (e.g. multiple available antenna arrays) to forward communications between multiple cells/TRPs and one or multiple UEs. The simultaneous communications may still be subject to half-duplex constraint: (DL, DL) or (UL, UL). In another example, for multiplexing communications of multiple cells/TRPs, the RU unit 320 can use SDM full-duplex where the repeater 204 may be capable of forwarding multiple simultaneous communications in different directions (UL, DL). SDM full duplex capability may depend on (1) the capability of the repeater, or (2) whether a satisfactory full-duplex performance can be achieved (depending on beams, TX powers, required link budget, etc.). In yet another example, for multiplexing communications of multiple cells/TRPs, the RU unit 320 can use TDM, where the repeater 204 may switch between multiple cells/TRPs in time (e.g., based on a communication direction for a time period, such as a symbol or slot, as described herein).

In some examples, the repeater 204 can transmit capability indications to perform one or more of the above functions. For example, in method 1200, optionally at Block 1212, a capability for supporting at least one of CA, DC, or multi-MT function can be indicated over the control connection. In an aspect, MT unit 318, e.g., in conjunction with communicating component 242, processor(s) 1012, memory 1016, transceiver 1002, etc., can indicate the capability for supporting at least one of CA, DC, or multi-MT function over the control connection. For example, MT unit 318 may indicate the capability in RRC signaling or other process in communicating with at least the first node or the second node. The nodes can use this information to determine how to provide control information to the repeater 204 (e.g., via only one cell, via multiple cells, etc.).

In another example, in method 1200, optionally at Block 1214, a capability for supporting one or more types of multiplexing for the repeater function based on properties of the two or more wireless nodes can be indicated. In an aspect, MT unit 318, e.g., in conjunction with communicating component 242, processor(s) 1012, memory 1016, transceiver 1002, etc., can indicate the capability for supporting the one or more types of multiplexing for the repeater function based on the properties of the two or more wireless nodes. For example, MT unit 318 may indicate the capability in RRC signaling or other process in communicating with at least the first node or the second node. The nodes can use this information to determine scheduling information, communication direction, beamforming information, etc. for providing to the repeater 204 to provide the repeater function for multiple nodes. In an example, the capability may indicate support of at least one of advanced multiplexing (SDM-half duplex or SDM-full duplex), or whether for a given set of cells/TRPs/beams/measured RX powers/target TX powers/UEs, repeater 204 can support FDM/SDM/full-duplex or whether the repeater only supports TDM. In this regard, in an example, the properties indicated for the two or more nodes may correspond to at least one of identities of the cells, identities of the TRPs, identities of the beams, identities of the users, a receive power threshold, or a transmission power threshold associated with the two or more wireless nodes, for which the repeater is capable of supporting one or more types of multiplexing. In any case, at least the first node or second node can determine the selected mode of operation for the repeater 204 and associated configurations, and may indicate to the repeater 204 in the control information, as described.

In addition, the control information may configure RRM measurements to be performed to determine multiplexing capabilities. In this regard, for example, in method 1200, optionally at Block 1216, measurements of signals associated with the two or more wireless nodes can be performed or an indication of the measurements can be transmitted. In an aspect, MT unit 318, e.g., in conjunction with communicating component 242, processor(s) 1012, memory 1016, transceiver 1002, etc., can perform, based on the control information, measurements of signals associated with the two or more wireless nodes, or transmit the indication of the measurements. For example, MT unit 318 can perform RRM measurements of the received signals and can report the measurements to at least the first node or the second node over the control connection. In this regard, at least the first node or the second node can determine the control information based on the RRM measurements, such as multiplexing capabilities of the repeater 204, beam pairs to use in communicating with the multiple wireless nodes, etc.

Figure 13:
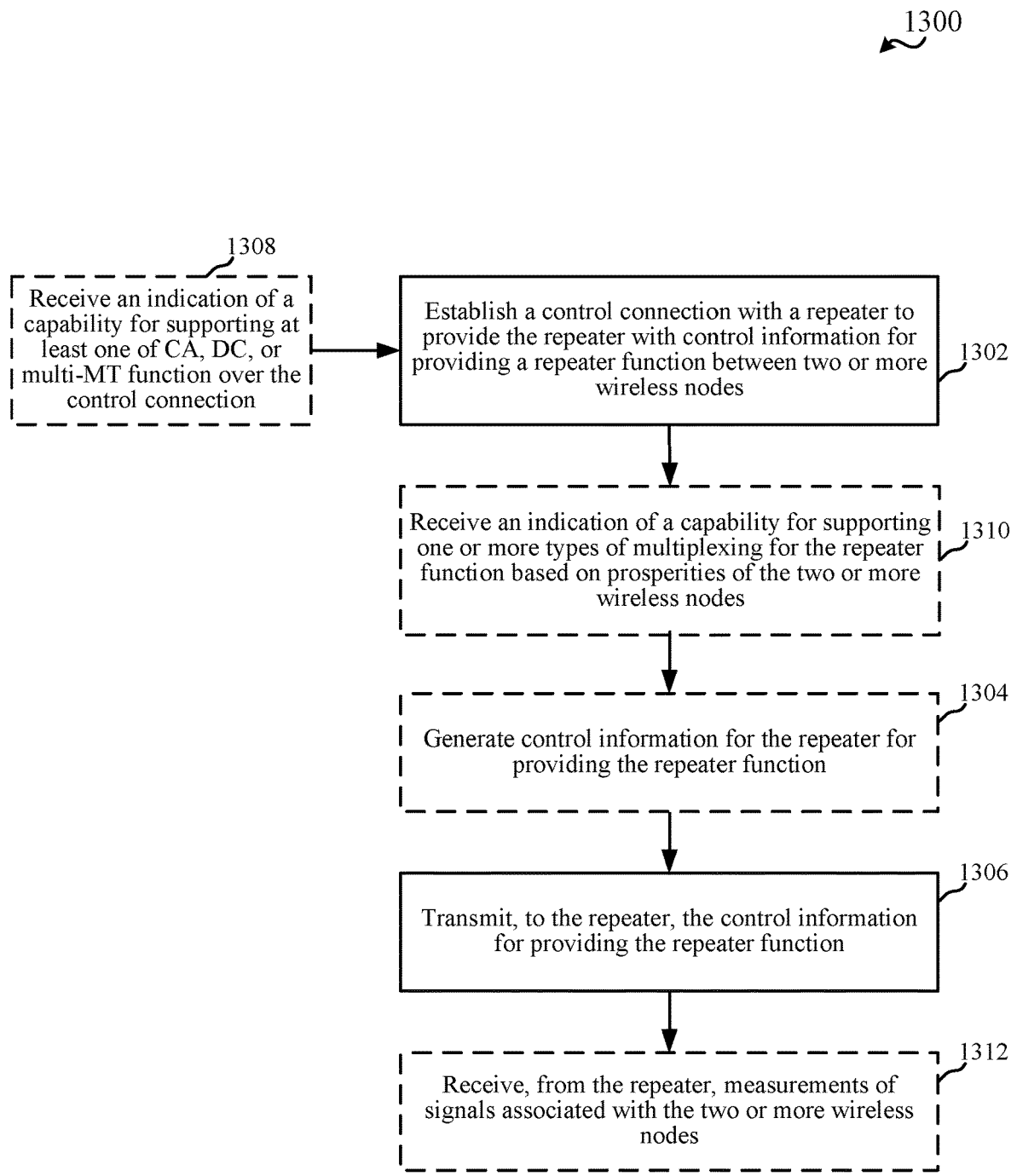
FIG. 13 illustrates a flow chart of an example of a method for configuring a repeater to provide a repeater function, in accordance with various aspects of the present disclosure.

FIG. 13 illustrates a flow chart of an example of a method 1300 for configuring a repeater to provide a repeater function. In an example, an upstream node 202 can perform one or more of the functions described in method 1300 using one or more of the components described in FIGS. 2 and 11.

In method 1300, at Block 1302, a control connection can be established with a repeater to provide the repeater with control information for providing a repeater function between two or more wireless nodes. In an aspect, repeater configuring component 1142, e.g., in conjunction with scheduling component 246, processor(s) 1112, memory 1116, transceiver 1102, etc., can establish the control connection with the repeater to provide the repeater with control information for providing a repeater function between two or more wireless nodes. As described, for example, upstream node 202 may be one of multiple upstream nodes to which a MT unit 318 of the repeater 204 connects for a control connection (e.g., whether as a primary cell, a secondary cell on which the MT unit 318 camps, etc.).

In method 1300, optionally at Block 1304, control information can be generated for the repeater for providing the repeater function. In an aspect, repeater configuring component 1142, e.g., in conjunction with scheduling component 246, processor(s) 1112, memory 1116, transceiver 1102, etc., can generate the control information for the repeater for providing the repeater function. For example, repeater configuring component 1142 can generate the control information to indicate a type of multiplexing to use and corresponding configuration information, beamforming information of beams to use in certain periods of time (e.g., symbols, slots, etc.), a communication direction over periods of time (e.g., for TDM or for half/full duplex SDM), which frequencies to use in FDM, which antenna elements to use for which wireless node in SDM, and/or the like. In one example, as described further herein, generating the control information can include determining control information based on parameters received for the two or more wireless nodes for which the repeater function is to be provided, for one or more other nodes with which the repeater establishes the control connection, etc.

In method 1300, at Block 1306, the control information can be transmitted, to the repeater, for providing the repeater function. In an aspect, repeater configuring component 1142, e.g., in conjunction with scheduling component 246, processor(s) 1112, memory 1116, transceiver 1102, etc., can transmit, to the repeater, the control information for providing the repeater function. For example, repeater configuring component 1142 can transmit the control information to the repeater 204 over the control connection. In an example, another node may transmit control information to the repeater 204 over the control connection as well (e.g., in CA, DC, multi-MT, etc.).

In method 1300, optionally at Block 1308, an indication of a capability for supporting at least one of CA, DC, or multi-MT function can be received over the control connection. In an aspect, repeater configuring component 1142, e.g., in conjunction with scheduling component 246, processor(s) 1112, memory 1116, transceiver 1102, etc., can receive, over the control connection, the indication of the capability for supporting at least one of CA, DC, or multi-MT function. In this example, repeater configuring component 1142 can determine to generate and/or transmit the control information for the repeater 204 based on the indicated capability. For example, repeater configuring component 1142 can determine for which wireless nodes to transmit control information based on the indication. In an example, where the indication of capability is not received or does not indicate CA, DC, or multi-MT, repeater configuring component 1142 can transmit control information related to all of the two or more wireless nodes. Where CA, DC, or multi-MT is supported, however, repeater configuring component 1142 may generate and transmit control information as part of multiple control information transmissions from other nodes, cells, etc.

In method 1300, optionally at Block 1310, an indication of a capability for supporting one or more types of multiplexing for the repeater function based on properties of the two or more wireless nodes can be received. In an aspect, repeater configuring component 1142, e.g., in conjunction with scheduling component 246, processor(s) 1112, memory 1116, transceiver 1102, etc., can receive the indication of the capability for supporting one or more types of multiplexing for the repeater function based on properties of the two or more wireless nodes. For example, as described, repeater configuring component 1142 can receive the indication as whether advanced multiplexing is supported (e.g., SDM half/full duplex), an indication of multiplexing types supported for given set of cells/TRPs/beams/measured RX powers/target TX powers/UEs, etc. In any case, repeater configuring component 1142 can determine one or more parameters for the control information to configure the repeater function based on the capability, which can include configuring beamforming information, communication direction, scheduling information, etc.

In method 1300, optionally at Block 1312, measurements of signals associated with the two or more wireless nodes can be received from the repeater. In an aspect, repeater configuring component 1142, e.g., in conjunction with scheduling component 246, processor(s) 1112, memory 1116, transceiver 1102, etc., can receive, from the repeater, measurements of signals associated with the two or more wireless nodes. For example, the upstream node 202 can configure the repeater 204 (e.g., via the control information or a separate configuration) to perform the RRM measurements. For example, the measurements can include RRM measurements, and repeater configuring component 1142 can use the RRM measurements (e.g., along with an indicated capability) to determining multiplexing type or related configuration parameters in generating the control information for the repeater 204. In another example, repeater configuring component 1142 can use the RRM measurements to determine beamforming information for the repeater 204 to use in providing the repeater function. For example, the beamforming information may indicate a receive beam to use for receiving downlink communications from an upstream node, a transmit beam to use for forwarding the downlink communications to a downstream node, a receive beam to use for receiving uplink communications from the downstream node, a transmit beam to use for forwarding the uplink communications to the upstream node, etc.

Figure 14:
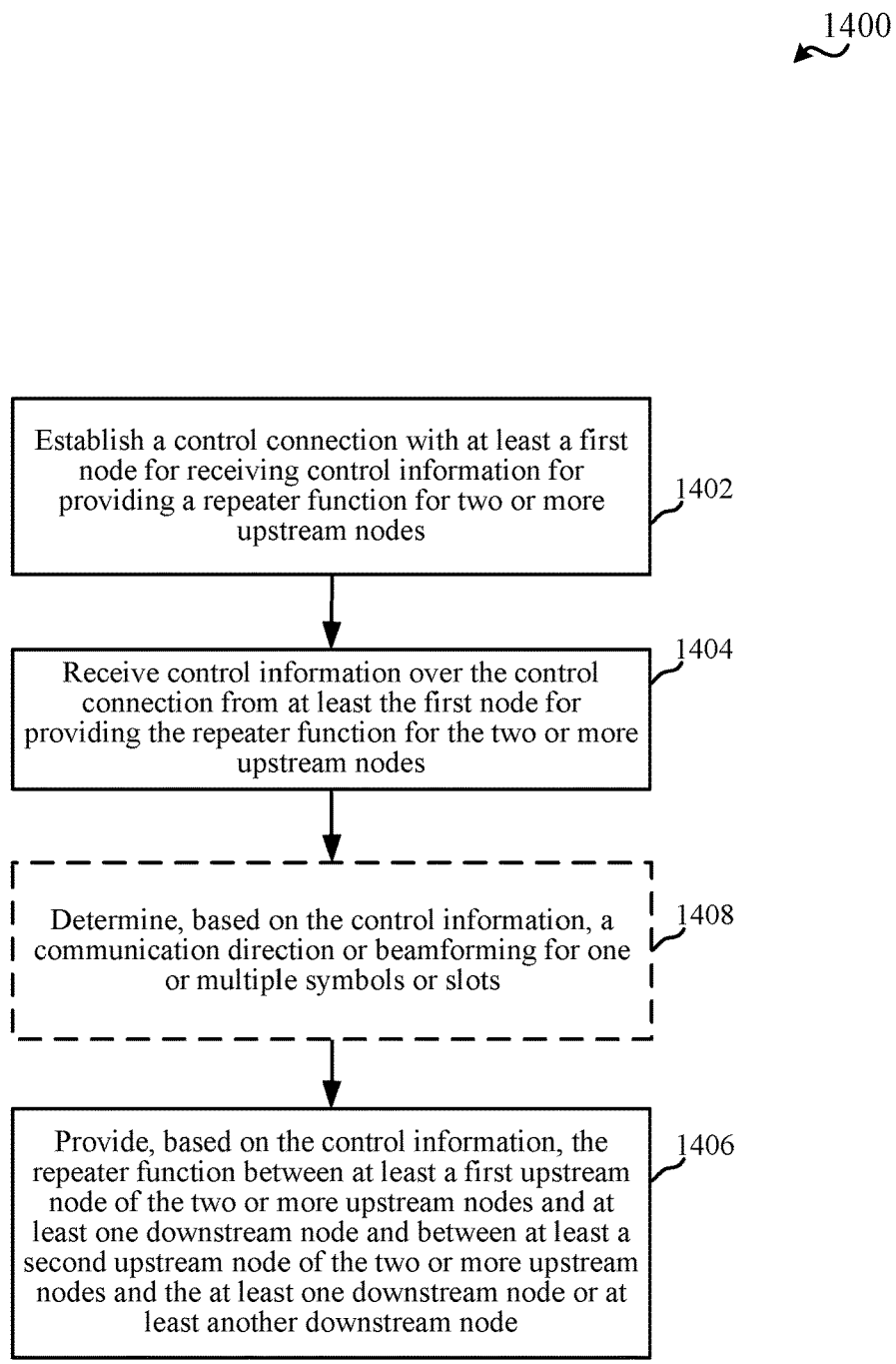
FIG. 14 illustrates a flow chart of an example of a method for providing a repeater function for two or more upstream nodes, in accordance with various aspects of the present disclosure.

FIG. 14 illustrates a flow chart of an example of a method 1400 for providing a repeater function for two or more upstream nodes. In an example, a repeater 204 can perform one or more of the functions described in method 1400 using one or more of the components described in FIGS. 2 and 10.

In method 1400, at Block 1402, a control connection with at least a first node and can be established for receiving control information for providing a repeater function for two or more upstream nodes. In an aspect, MT unit 318, e.g., in conjunction with communicating component 242, processor(s) 1012, memory 1016, transceiver 1002, etc., can establish the control connection with at least the first node for receiving control information for providing the repeater function for the two or more upstream nodes. In one example, the node(s) providing the control information can be the same as, or different from, the upstream nodes for which the repeater 204 is providing the repeater function. In an example, MT unit 318 can establish the connection with at least the first node as an upstream node (or multiple upstream nodes) for receiving the control information to control the repeater function, as described above.

In method 1400, at Block 1404, control information can be received over the control connection from at least the first node for providing the repeater function for the two or more upstream nodes. In an aspect, MT unit 318, e.g., in conjunction with communicating component 242, processor(s) 1012, memory 1016, transceiver 1002, etc., can receive the control information over the control connection from at least the first node for providing the repeater function for the two or more upstream nodes. In an example, the control information can include one or more TDD patterns for providing the repeater function for the two or more upstream nodes in TDD (or in other multiplexing schemes, such as half/full duplex SDM). Moreover, as described for example, the repeater 204 may be connected with one or multiple nodes for the control connection and may receive the control information from one or multiple nodes. The control information may include information for one or more of the two or more upstream nodes. Thus, in one example, the control information can include separate control information for each upstream node or control information that is generated for a combination of multiple upstream nodes.

In an example, each cell or TRP may have its own TDD configuration for communication direction or beamforming information per symbol or slot, etc. In one example, MT unit 318 can receive control information in the form of a single TDD pattern (e.g., for any given symbol/slot, there can be a single UL/DL/F state), by the one or multiple cells on which it camps. In an example, RU 320 can use the single TDD pattern to determine the repeater function. In this example, the single TDD pattern can be determined (e.g., by either of the serving cell(s), DU, CU, network) based on the TDD patterns of the multiple cells or TRPs. In another example, the single TDD pattern can be determined additionally based on the decision on the schedule of the repeater 204, UEs being served by the repeater and the associated cells/TRPs, etc. In an example, the single TDD pattern may be indicated as TDD-UL-DL-ConfigDedicated (in which case the fact that the pattern is for multiple upstream nodes can be transparent to the repeater 204 based on using a legacy message). In another example, the single TDD pattern may be indicated as a new TDD-UL-DL-Configuration message that can be sent as an RRC message, or MAC-CE. The repeater 204 may or may not be aware that it is forwarding communications of multiple cells/TRPs. In a specific example, where cell1/TRP1's TDD pattern for N slots/symbol=[D U F F F D U] (e.g., N=7) and cell2/TRP2's TDD pattern for N slots/symbol=[D U F D U F F], the Single TDD pattern indicated to repeater=[D U F D U D U], such that flexible slots/symbols for one TDD pattern can take on UL or DL depending on a direction of the same slot/symbol index of the other TDD pattern. In another example, if the schedule of repeater is such that in slot/symbol n, it is supposed to forward communications for cell/TRP i, the TDD pattern of slot/symbol n may be determined based on the TDD pattern of cell/TRP i for that slot/symbol.

In another example, MT unit 318 can receive the control information in the form of multiple TDD patterns, where each TDD pattern can correspond to one of multiple cells/ TRPs. For example, the repeater 204 can be provided with multiple TDD patterns, by the one or multiple cells on which it camps. In an example, RU unit 320 can use the multiple TDD patterns to determine the repeater function. In one example, each of the multiple TDD patterns can be determined (by either of the serving cell(s), DU, CU, network) based on the TDD patterns of one or a subset of multiple cells or TRPs. In one example, each of multiple TDD patterns may be indicated as TDD-UL-DL-ConfigDedicated (in which case the fact that the pattern is for multiple upstream nodes can be transparent to the repeater 204 based on using a legacy message). In another example, each of multiple TDD patterns may be indicated using a new TDD-UL-DL-Configuration message that can be sent as an RRC message, or MAC-CE. In this example, each pattern can be properly indexed, where the index can refer to a cell identifier, TRP identifier, beam identifier (e.g., TCI state), or general index number such that RU unit 320 can determine the upstream node to which the TDD pattern relates. In an example, the TDD patterns can include a cell-specific or a dedicated TDD configuration received in association with the established control connection.

In one example, MT unit 318 can receive control information (which may be dynamically provided or updated control information) that indicates an index (or multiple indices) referring to the associated TDD pattern(s). For example, MT unit 318 may also receive control information indicating one or multiple index values corresponding to each upstream node. This index value can then be used to refer to a TDD pattern for the upstream node. Thus, for example, MT unit 318 can determine a TDD pattern (or associated communication direction or beamforming) for each of the one or multiple symbols or slots based on the received one or multiple index values, the first TDD pattern, and the second TDD pattern. In an example, the control information can indicate one or multiple index values received dynamically or in a semi-static manner, where the one or multiple index values are associated with a periodic pattern or a schedule for the repeater, downstream nodes being served by the repeater, or the two upstream nodes.

For example, the control information may configure the repeater 204 to forward the communication of cell/TRP i for the next slots/symbols by indicating the cell id/TRP id or the index of the associated TDD pattern. By doing so, in this example, control information may not need to include associated TDD information. In another example, MT unit 38 may receive another semi-static scheduling pattern, where the pattern indicates (for each time resource—e.g., slots/ symbols) which TDD pattern to use to determine the forwarding direction. For example, it may be decided that RU unit 320 is to forward cell 1's and cell 2's communications on respectively even and odd slots. In this example, a pattern of [cell id 1, cell id 2] would indicate how to determine the DL/UL state of each resource by referring to the associated cell 1 and 2's TDD patterns. Whether based on the single received TDD pattern or determining the TDD pattern based on multiple received TDD patterns, as described, RU unit 320 can provide the repeater function for the multiple upstream nodes.

In method 1400, at Block 1406, the repeater function can be provided between at least a first upstream node of the two or more upstream nodes and at least one downstream node and between at least a second upstream node of the two or more upstream nodes and the at least one downstream node or at least another downstream node. In an aspect, RU unit 320, e.g., in conjunction with communicating component 242, processor(s) 1012, memory 1016, transceiver 1002, etc., can provide the repeater function between at least a first upstream node of the two or more upstream nodes and at least one downstream node and between at least a second upstream node of the two or more upstream nodes and the at least one downstream node or at least another downstream node. For example, RU unit 320 can provide the repeater function between the two or more wireless nodes including at least one of (1) receiving downlink signals from an upstream node, optionally amplifying the downlink signals, and forwarding the downlink signals to a downstream node, or (2) receiving uplink signals from a downstream node, optionally amplifying the uplink signals, and forwarding the uplink signals to an upstream node.

In an example, in method 1400, optionally at Block 1408, a communication direction or beamforming for one or multiple symbols or slots can be determined based on the control information. In an aspect, MT unit 318, e.g., in conjunction with communicating component 242, processor(s) 1012, memory 1016, transceiver 1002, etc., can determine, based on the control information, a communication direction or beamforming for one or multiple symbols or slots. Thus, for example, RU unit 320 can determine a beam to use for a given period of time based on beamforming information and TDD pattern(s) indicated in the control information (e.g., as a beam or beam pair to use, which can be indicated via a TCI state or corresponding index), and in providing the repeater function can use the beam for transmitting or receiving communications in the period of time. For example, RU unit 320 can determine the beamforming information based on the single TDD pattern (which may indicate a beam, beam pair, or set of beams to use in each time period), or based on multiple TDD patterns, as described above. In another example, RU unit 320 can determine a communication direction for the period of time (e.g., for TDM or other multiplexing types), which may be based on the control information and TDD pattern(s) as well, or related received scheduling information from the nodes for which the repeater function is provided. For example, RU unit 320 can determine the communication direction based on the single TDD pattern (which may indicate UL/DL/F for each time period), or based on multiple TDD patterns, as described above.

Figure 15:
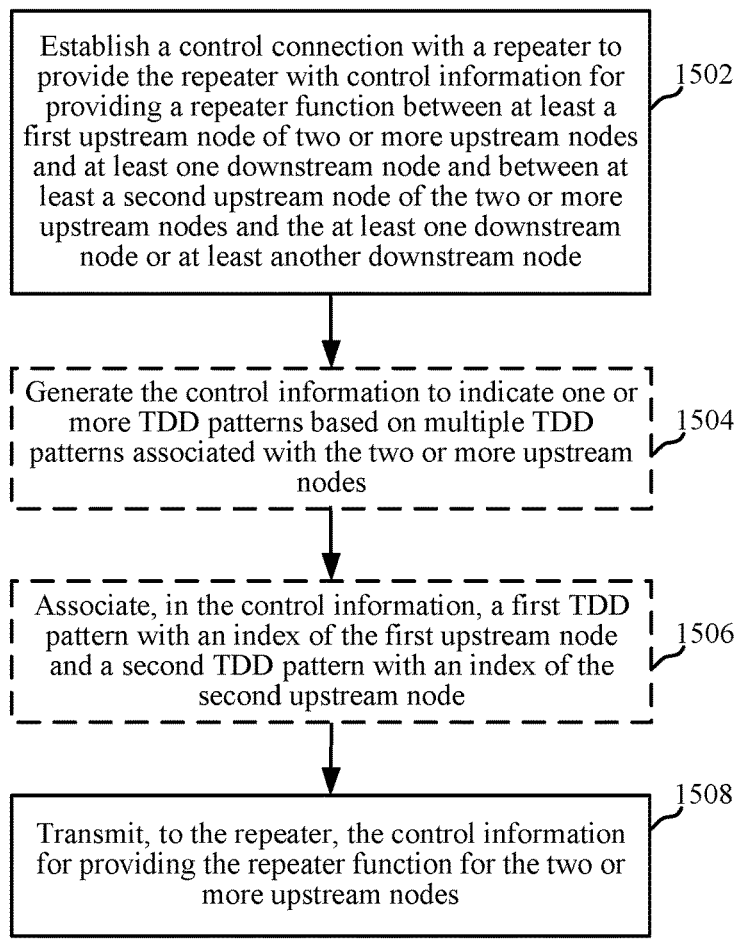
FIG. 15 illustrates a flow chart of an example of a method for configuring a repeater to provide a repeater function for two or more upstream nodes, in accordance with various aspects of the present disclosure.

FIG. 15 illustrates a flow chart of an example of a method 1500 for configuring a repeater to provide a repeater function for two or more upstream nodes. In an example, an upstream node 202 can perform one or more of the functions described in method 1500 using one or more of the components described in FIGS. 2 and 11.

In method 1500, at Block 1502, a control connection can be established with a repeater to provide the repeater with control information for providing a repeater function between at least a first upstream node of two or more upstream nodes and at least one downstream node and between at least a second upstream node of the two or more upstream nodes and the at least one downstream node or at least another downstream node. In an aspect, repeater configuring component 1142, e.g., in conjunction with scheduling component 246, processor(s) 1112, memory 1116, transceiver 1102, etc., can establish the control connection with the repeater to provide the repeater with control information for providing a repeater function between at least a first upstream node of two or more upstream nodes and at least one downstream node and between at least a second upstream node of the two or more upstream nodes and the at least one downstream node or at least another downstream node. As described, for example, upstream node 202 may be one of multiple upstream nodes to which a MT unit 318 of the repeater 204 connects for a control connection (e.g., whether as a primary cell, a secondary cell on which the MT unit 318 camps, etc.).

In method 1500, optionally at Block 1504, control information can be generated to indicate one or more TDD patterns based on multiple TDD patterns associated with the two or more upstream nodes. In an aspect, repeater configuring component 1142, e.g., in conjunction with scheduling component 246, processor(s) 1112, memory 1116, transceiver 1102, etc., can generate the control information to indicate one or more TDD patterns based on multiple TDD patterns associated with the two or more upstream nodes. For example, repeater configuring component 1142 can generate the control information to be in the form of a single TDD pattern that takes into account multiple TDD patterns for the two or more upstream nodes. As described, in an example, repeater configuring component 1142 can generate the single TDD pattern to align with the multiple TDD patterns (e.g., to change flexible symbols or slots indicated by one pattern to UL or DL based on another pattern). In another example, repeater configuring component 1142 can determine a TDD pattern for each of the upstream nodes. Moreover, as described, the TDD pattern can relate to beamforming information for each period of time (e.g., symbol, slot, etc.), communication direction for each period of time, and/or the like.

In method 1500, optionally at Block 1506 for multiple TDD patterns, in the control information, a first TDD pattern can be associated with an index of the first upstream node and a second TDD pattern can be associated with the second upstream node. In an aspect, repeater configuring component 1142, e.g., in conjunction with scheduling component 246, processor(s) 1112, memory 1116, transceiver 1102, etc., can associate, in the control information, the first TDD pattern with the index of the first upstream node and the second TDD pattern with the index of the second upstream node. For example, as described, repeater configuring component 1142 can configure the repeater with indices corresponding to the two or more upstream nodes, and then can associate TDD pattern information (e.g., whether for beamforming or communication direction) with an index to indicate to which upstream node the TDD pattern is associated.

In method 1500, at Block 1508, the control information can be transmitted, to the repeater, for providing the repeater function for the two or more upstream nodes. In an aspect, repeater configuring component 1142, e.g., in conjunction with scheduling component 246, processor(s) 1112, memory 1116, transceiver 1102, etc., can transmit, to the repeater, the control information for providing the repeater function to the two or more upstream nodes. For example, repeater configuring component 1142 can transmit the control information to the repeater 204 over the control connection. In an example, another node may transmit control information to the repeater 204 over the control connection as well (e.g., in CA, DC, multi-MT, etc.).

Figure 16:
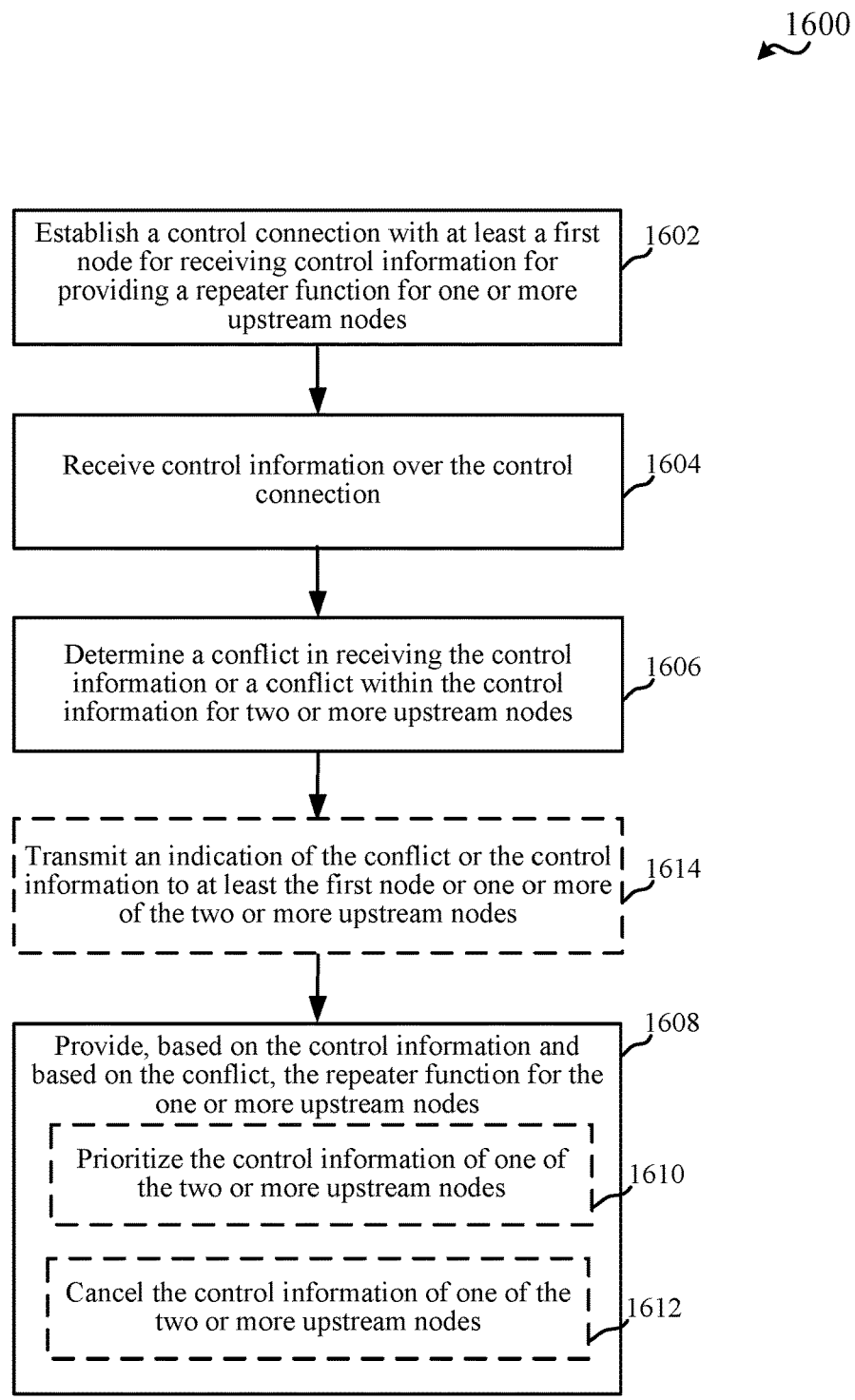
FIG. 16 illustrates a flow chart of an example of a method for resolving conflicts in control information or other information for providing a repeater function, in accordance with various aspects of the present disclosure.

FIG. 16 illustrates a flow chart of an example of a method 1600 for resolving conflicts in control information or other information for providing a repeater function. In an example, a repeater 204 can perform one or more of the functions described in method 1600 using one or more of the components described in FIGS. 2 and 10.

In method 1600, at Block 1602, a control connection with at least a first node and can be established for receiving control information for providing a repeater function for one or more upstream nodes. In an aspect, MT unit 318, e.g., in conjunction with communicating component 242, processor(s) 1012, memory 1016, transceiver 1002, etc., can establish the control connection with at least the first node for receiving control information for providing the repeater function for the one or more upstream nodes. In one example, the node(s) providing the control information can be the same as, or different from, the upstream node(s) for which the repeater 204 is providing the repeater function. In an example, MT unit 318 can establish the connection with at least the first node as an upstream node (or multiple upstream nodes) for receiving the control information to control the repeater function, as described above.

In method 1600, at Block 1604, control information can be received over the control connection. In an aspect, MT unit 318, e.g., in conjunction with communicating component 242, processor(s) 1012, memory 1016, transceiver 1002, etc., can receive the control information over the control connection. In an example, the control information can include one or more TDD patterns for providing the repeater function for the one or more upstream nodes in TDD (or in other multiplexing schemes, such as half/full duplex SDM) or other control information. Moreover, as described for example, the repeater 204 may be connected with one or multiple nodes for the control connection and may receive the control information from one or multiple nodes. The control information may include information for one or more upstream nodes. Thus, in one example, the control information can include separate control information for each of multiple upstream nodes.

In an example, the repeater 204 may receive multiple potentially conflicting control information or related commands or parameters (e.g., from different nodes with which the control connection is established or otherwise). For example, the repeater 204 can be configured to monitor for repeater control information on multiple search spaces (e.g. associated with different TRPs). In another example, the repeater 204 can be configured to monitor for repeater control information on multiple cells (e.g., in DC/CA, or multi-MT). In yet another example, the repeater 204 may receive multiple configurations (via MAC-CE or RRC) from the same or multiple cells that may be conflicting.

In method 1600, at Block 1606, a conflict can be determined in receiving the control information or within the control information for two or more upstream nodes. In an aspect, conflict resolving component 1048, e.g., in conjunction with communicating component 242, processor(s) 1012, memory 1016, transceiver 1002, etc., can determine the conflict in receiving the control information or the conflict within the control information for two or more upstream nodes. For example, conflict resolving component 1048 can determine the conflict as a potential conflict based on receiving multiple control information or based on analyzing the contents of the control information to detect an actual conflict (e.g., different communication directions or beams indicated for the same period of time).

In method 1600, at Block 1608, the repeater function for the one or more upstream nodes can be provided based on the control information and based on the conflict. In an aspect, RU unit 320, e.g., in conjunction with communicating component 242, processor(s) 1012, memory 1016, transceiver 1002, etc., can provide, based on the control information and based on the conflict, the repeater function for the one or more upstream nodes. For example, RU unit 320 can provide the repeater function between the one or more upstream nodes and one or more downstream nodes including at least one of (1) receiving downlink signals from an upstream node, optionally amplifying the downlink signals, and forwarding the downlink signals to a downstream node, or (2) receiving uplink signals from a downstream node, optionally amplifying the uplink signals, and forwarding the uplink signals to an upstream node. Moreover, providing the repeater function can include determining a communication direction, beamforming information, etc. for communicating between the one or more upstream nodes and one or more downstream nodes, which can be determined based on the control information received and the conflict.

For example, in providing the repeater function at Block 1608, optionally at Block 1610, the control information of one of the two or more upstream nodes, can be prioritized. In an aspect, conflict resolving component 1048, e.g., in conjunction with communicating component 242, processor(s) 1012, memory 1016, transceiver 1002, etc., can prioritize the control information of one of the two or more upstream nodes. In another example, in providing the repeater function at Block 1608, optionally at Block 1612, the control information of one of the two or more upstream nodes, can be cancelled. In an aspect, conflict resolving component 1048, e.g., in conjunction with communicating component 242, processor(s) 1012, memory 1016, transceiver 1002, etc., can cancel the control information of one of the two or more upstream nodes. For example, conflict resolving component 1048 can prioritize or cancel the actual control information received for the one of the two or more upstream nodes (or based on determining the control information is received from a given node), which can be based on determining a conflict in receiving control information. In another example, conflict resolving component 1048 can prioritize or cancel communication direction, beamforming information, etc. for one of two or more upstream nodes in a particular symbol or slot based on determining a conflict between the control information indicated for the particular symbol or slot for the first and second upstream nodes. In yet another example, conflict resolving component 1048 can cancel control information, communication direction, beamforming information, etc. for both (or all) upstream nodes based on determining the conflict.

In an example, prioritization rules can be defined for use by the conflict resolving component 1048. In one example, a prioritization rule can relate to primary vs secondary cells. In this example, a command received from (or a configuration associated with) a primary cell may override the one received from a secondary cell. In another example, a prioritization rule can relate to whether to prioritize MCG over SCG or SCG over MCG. In an example, if the repeater is configured for DC, the configuration associated with or received from an MCG cell may have higher priority. In an example, a prioritization rule can relate to later control overriding where a more recent indicated configuration may override the previous one (e.g., based on comparing a time associated with receiving a first configuration to a time associated with receiving a second configuration to determine which is later). The priority can also be defined to be beam-dependent, physical-channel-dependent (in case the repeater is aware of the type of the forwarded signals), direction-dependent (e.g., DL having higher priority than UL, which may further depend on the time (e.g., symbol/slot index), and/or the like), etc. In other examples, new prioritization values/indices may be defined and communicated for various commands/configurations. Prioritization may be left to the repeater's implementation. In addition, as described, the repeater 204 may cancel the conflicting schedules.

In method 1600, optionally at Block 1614, an indication of the conflict or the control information can be transmitted to at least the first node or one or more of the two or more upstream nodes. In an aspect, conflict resolving component 1048, e.g., in conjunction with communicating component 242, processor(s) 1012, memory 1016, transceiver 1002, etc., can transmit the indication of the conflict or the control information to at least the first node or one or more of the two or more upstream nodes. This can enable at least the first node (e.g., the node providing the control information) or the two or more upstream nodes (e.g., the nodes for which the repeater function is provided) to generate and/or indicate a different configuration or control information to the repeater 204 to resolve the conflict. In this regard, for example, the repeater 204 may send feedback to one or multiple other (serving) nodes, which can include an indication there is a conflict, or sharing the other conflicting configuration, or suggesting a new configuration. In one example, this can be done a priori and in advance (and to avoid conflict). One or more upstream nodes may accordingly update or transmit control information to the repeater 204, and the repeater 204 can provide the repeater function based on updated or indicated control information.

Figure 17:
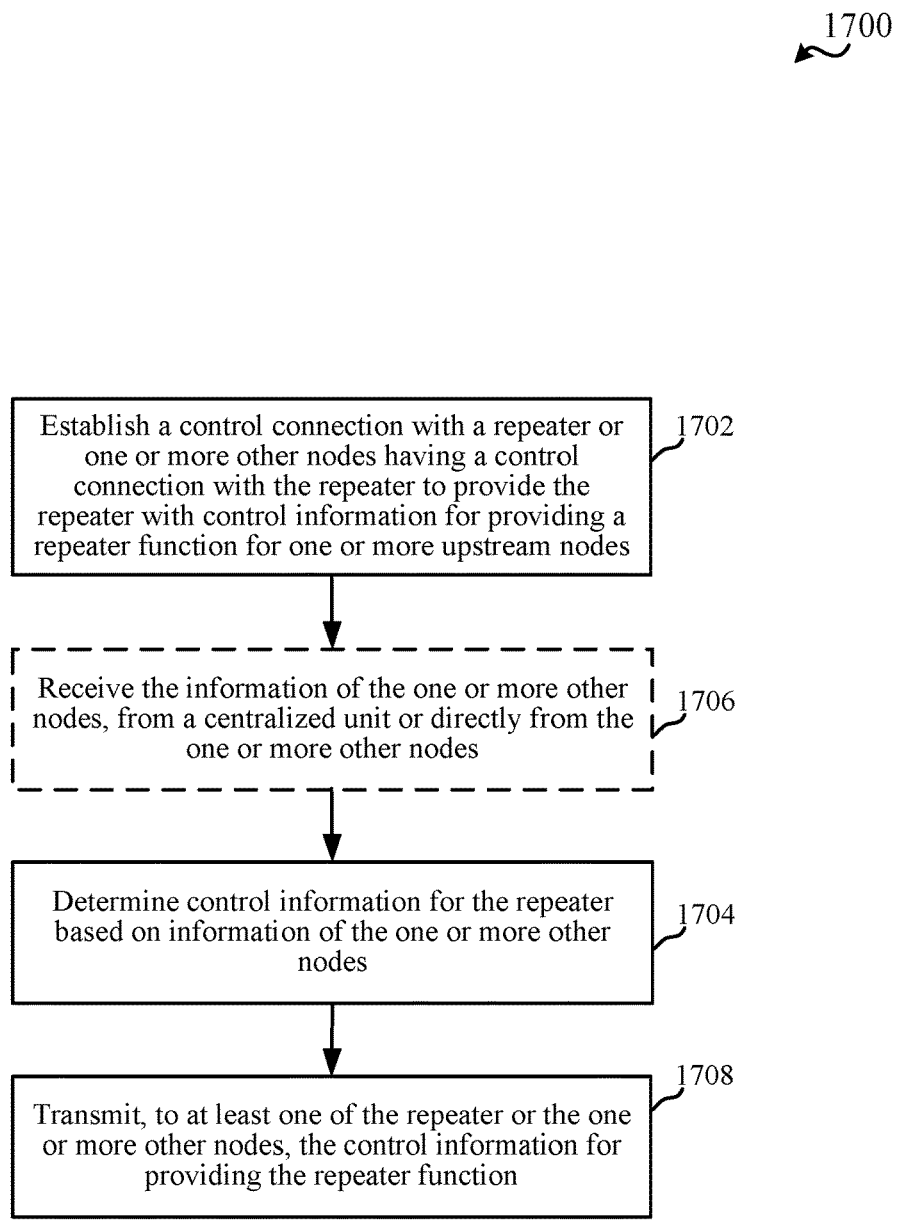
FIG. 17 illustrates a flow chart of an example of a method for avoiding conflicts in configuring a repeater to provide a repeater function, in accordance with various aspects of the present disclosure.

FIG. 17 illustrates a flow chart of an example of a method 1700 for avoiding conflicts in configuring a repeater to provide a repeater function. In an example, an upstream node 202 can perform one or more of the functions described in method 1700 using one or more of the components described in FIGS. 2 and 11.

In method 1700, at Block 1702, a control connection can be established with a repeater or one or more other noes having a control connection with the repeater to provide the repeater with control information for providing a repeater function for one or more upstream nodes. In an aspect, repeater configuring component 1142, e.g., in conjunction with scheduling component 246, processor(s) 1112, memory 1116, transceiver 1102, etc., can establish the control connection with the repeater or with one or more other nodes having a control connection with the repeater to provide the repeater with control information for providing a repeater function for one or more upstream nodes. As described, for example, upstream node 202 may be one of multiple upstream nodes to which a MT unit 318 of the repeater 204 connects for a control connection (e.g., whether as a primary cell, a secondary cell on which the MT unit 318 camps, etc.).

In method 1700, optionally at Block 1704, control information for the repeater can be determined based on information of the one or more other nodes. In an aspect, repeater configuring component 1142, e.g., in conjunction with scheduling component 246, processor(s) 1112, memory 1116, transceiver 1102, etc., can determine or generate the control information for the repeater based on information of the one or more other nodes. In an example, repeater configuring component 1142 can communicate with the one or more other nodes to receive the information related to the one or more other nodes. For example, upstream node 202 and the one or more other nodes can be non-collocated cells, DUs, separate CUs, etc., and can communicate with one another over one or more backhaul links. For example, the nodes can exchange information regarding configuring the repeater 204 (e.g., which communication direction or beamforming information to be used for a given time period, which node has priority in which time period, etc.), and repeater configuring component 1142 can use this information or negotiation to generate control information for the repeater 204. Coordinating the repeater configuration in this regard can avoid conflict in control information sent to the repeater 204.

In an example, in method 1700, optionally at Block 1706, the information of the one or more other nodes can be received from a centralized unit or directly from the one or more other nodes. In an aspect, repeater configuring component 1142, e.g., in conjunction with scheduling component 246, processor(s) 1112, memory 1116, transceiver 1102, etc., can receive the information of the one or more other nodes from a CU or directly from the one or more other nodes (e.g., over a backhaul link).

For example, where there is a single scheduler that configures the repeater function of the repeater 204 and sends corresponding control information or repeater configuration commands, there may not be conflict. Multiple schedulers may be involved, however, which may potentially lead to conflicts described herein. Accordingly, for example, CUs can coordinate repeater configuration information. For example, where two upstream nodes (e.g., cells) are associated with different DUs (of the same CU) and are configured to use the same repeater 204, the CU can coordinate—e.g. via exchanging information (intended configurations, schedules, TDD patterns, beam patterns, power configuration, etc.) between DUs. For example, the CU can determine and indicate the configuration to the DUs (e.g. deciding the TDD patterns, how to multiplex the repeater (e.g. a TDM, FDM, SDM, full-duplex pattern), power configuration of the repeater, beam coordination, which UEs being served via the repeater, etc.). Then, one or more of the DUs can accordingly provide the configuration or related control information to the repeater 204.

In another example, CUs can coordinate over an Xn backhaul interface between the CUs. In this example, two upstream nodes (e.g., cells) can be associated with different DUs/CUs and can be configured to use the same repeater 204. In this example, the two CUs may coordinate over the Xn interface—e.g. via exchanging information (as above), requesting/suggesting a configuration, etc.). One CU can become in charge of determining the configuration, as described. In another example, in case of two mobile network operators sharing the repeater 204, there could be a semi-static agreement/coordination between the two operators—e.g. to determine a common TDD pattern, a multiplexing pattern, beam coordination, power coordination, etc. In this example, one or more of the DUs can accordingly provide the configuration or related control information to the repeater 204. In either case, conflicts can be avoided in this regard.

In method 1700, at Block 1708, the control information can be transmitted, to the repeater or the one or more other nodes for providing the repeater function. In an aspect, repeater configuring component 1142, e.g., in conjunction with scheduling component 246, processor(s) 1112, memory 1116, transceiver 1102, etc., can transmit, to the repeater or the one or more other nodes, the control information for providing the repeater function. For example, repeater configuring component 1142 can transmit the control information to the repeater 204 over the control connection using one or more of multiple upstream nodes. In an example, another node may transmit control information to the repeater 204 over the control connection as well (e.g., in CA, DC, multi-MT, etc.).

Figure 18:
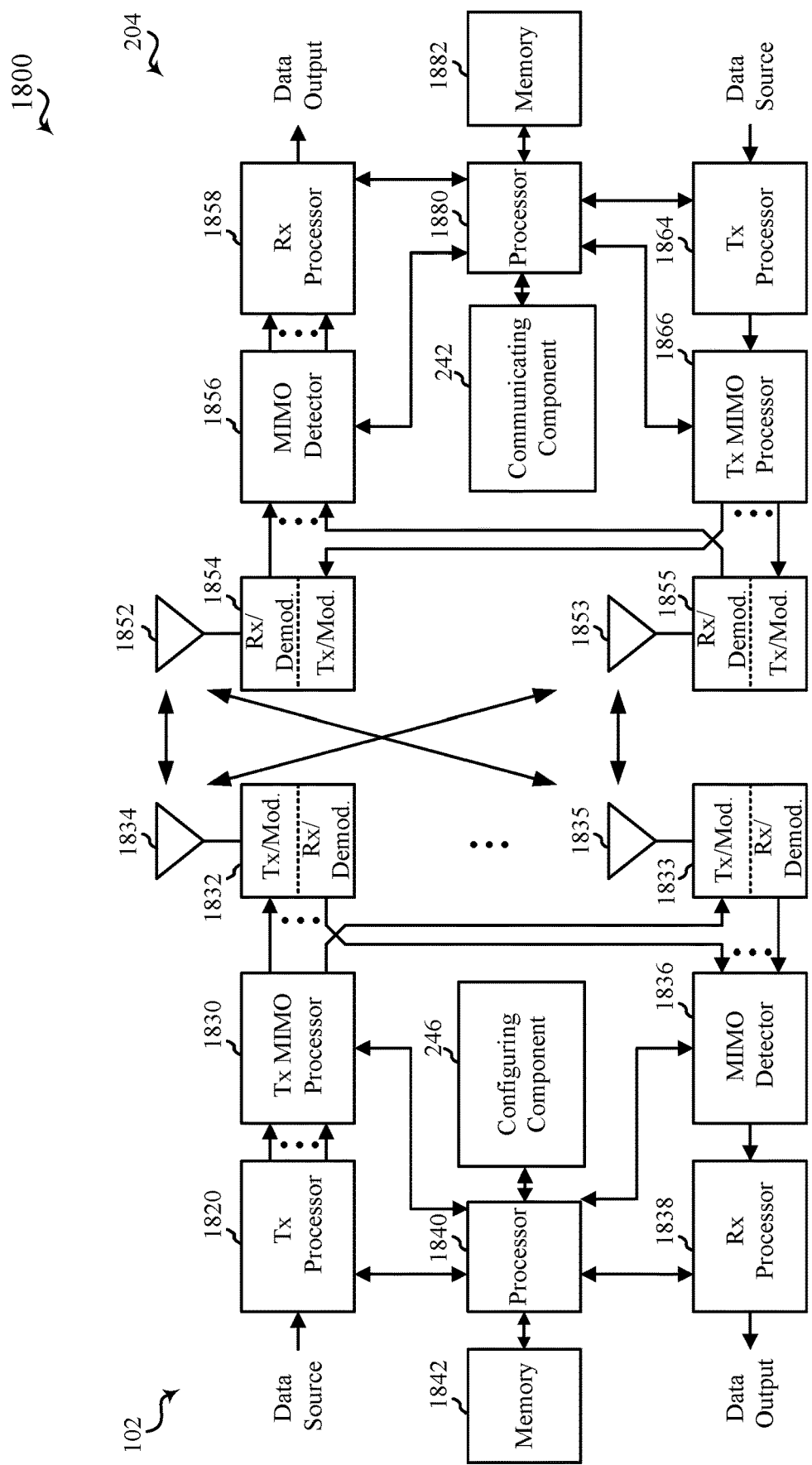
FIG. 18 is a block diagram illustrating an example of a multiple-input multiple-output (MIMO) communication system including a base station and a UE, in accordance with various aspects of the present disclosure.

FIG. 18 is a block diagram of a MIMO communication system 1800 including a base station 102 and a repeater 204 (or a MT unit thereof, a UE, or other downstream node). The MIMO communication system 1800 may illustrate aspects of the wireless communication access network 100 described with reference to FIG. 1. The base station 102 may be an example of aspects of the base station 102 described with reference to FIG. 1. The base station 102 may be equipped with antennas 1834 and 1835, and the repeater 204 may be equipped with antennas 1852 and 1853. In the MIMO communication system 1800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the repeater 204 is two.

At the base station 102, a transmit (Tx) processor 1820 may receive data from a data source. The transmit processor 1820 may process the data. The transmit processor 1820 may also generate control symbols or reference symbols. A transmit MIMO processor 1830 may perform spatial processing (e.g., precoding) on data symbols, control symbols, or reference symbols, if applicable, and may provide output symbol streams to the transmit modulator/demodulators 1832 and 1833. Each modulator/demodulator 1832 through 1833 may process a respective output symbol stream (e.g., for OFDM, etc.) to obtain an output sample stream. Each modulator/demodulator 1832 through 1833 may further process (e.g., convert to analog, amplify, filter, and upconvert) the output sample stream to obtain a DL signal. In one example, DL signals from modulator/demodulators 1832 and 1833 may be transmitted via the antennas 1834 and 1835, respectively.

The repeater 204 may be an example of aspects of the repeaters 204 described with reference to FIGS. 1-3, etc. At the repeater 204, the repeater antennas 1852 and 1853 may receive the DL signals from the base station 102 and may provide the received signals to the modulator/demodulators 1854 and 1855, respectively. Each modulator/demodulator 1854 through 1855 may condition (e.g., filter, amplify, downconvert, and digitize) a respective received signal to obtain input samples. Each modulator/demodulator 1854 through 1855 may further process the input samples (e.g., for OFDM, etc.) to obtain received symbols. A MIMO detector 1856 may obtain received symbols from the modulator/demodulators 1854 and 1855, perform MIMO detection on the received symbols, if applicable, and provide detected symbols. A receive (Rx) processor 1858 may process (e.g., demodulate, deinterleave, and decode) the detected symbols, providing decoded data for the repeater 204 to a data output, and provide decoded control information to a processor 1880, or memory 1882.

The processor 1880 may in some cases execute stored instructions to instantiate a communicating component 242 (see e.g., FIGS. 2 and 10) for providing a repeater function.

On the uplink (UL), at the repeater 204, a transmit processor 1864 may receive and process data from a data source. The transmit processor 1864 may also generate reference symbols for a reference signal. The symbols from the transmit processor 1864 may be precoded by a transmit MIMO processor 1866 if applicable, further processed by the modulator/demodulators 1854 and 1855 (e.g., for SC-FDMA, etc.), and be transmitted to the base station 102 in accordance with the communication parameters received from the base station 102. At the base station 102, the UL signals from the repeater 204 may be received by the antennas 1834 and 1835, processed by the modulator/demodulators 1832 and 1833, detected by a MIMO detector 1836 if applicable, and further processed by a receive processor 1838. The receive processor 1838 may provide decoded data to a data output and to the processor 1840 or memory 1842.

The processor 1840 may in some cases execute stored instructions to instantiate a scheduling component 246 (see e.g., FIGS. 2 and 11) for configuring a repeater to provide a repeater function.

The components of the repeater 204 may, individually or collectively, be implemented with one or more ASICs adapted to perform some or all of the applicable functions in hardware. Each of the noted modules may be a means for performing one or more functions related to operation of the MIMO communication system 1800. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1800.

The following aspects are illustrative only and aspects thereof may be combined with aspects of other embodiments or teaching described herein, without limitation.

Aspect 1 is a method for wireless communication at a repeater including establishing a control connection with at least a first node and a second node for receiving control information for providing a repeater function between two or more wireless nodes, receiving the control information over the control connection from one or more of at least the first node or the second node, and providing, based on the control information, the repeater function between the two or more wireless nodes.

In Aspect 2, the method of Aspect 1 includes wherein at least the first node and the second node are different TRPs of a serving cell.

In Aspect 3, the method of any of Aspects 1 or 2 includes wherein at least the first node forwards signals from the second node.

In Aspect 4, the method of Aspect 1 includes wherein at least the first node and the second node are different cells of a master cell group.

In Aspect 5, the method of Aspect 1 includes wherein the first node is a cell of a master cell group and the second node is a cell of a secondary cell group.

In Aspect 6, the method of any of Aspects 1 to 5 includes wherein establishing the control connection includes establishing a first control connection with the first node using a first mobile termination unit of the repeater and establishing a second control connection with the second node using a second mobile termination unit of the repeater.

In Aspect 7, the method of any of Aspects 1 to 6 includes wherein the control information includes a repeater configuration for controlling the repeater function.

In Aspect 8, the method of Aspect 7 includes wherein receiving the control information includes receiving a DCI format, MAC-CE, or RRC message that indicates the repeater configuration.

In Aspect 9, the method of any of Aspects 7 or 8 includes wherein receiving the control information includes receiving the repeater configuration over the control connection from only the first node.

In Aspect 10, the method of any of Aspects 7 or 8 includes wherein receiving the control information includes receiving the repeater configuration over the control connection from at least the first node and the second node.

In Aspect 11, the method of any of Aspects 7, 8, or 10 includes wherein receiving the control information includes receiving a first repeater configuration over the control connection from the first node and receiving a second repeater configuration over the control connection from the second node.

In Aspect 12, the method of any of Aspects 1 to 11 includes wherein providing the repeater function includes at least one of multiplexing downlink transmissions received from at least a first wireless node and a second wireless node of the two or more wireless nodes over a fronthaul link and forwarding the downlink transmissions to at least a third wireless node of the two or more wireless nodes, or multiplexing an uplink transmission received from at least the third wireless node for forwarding as a first uplink transmission to at least the first wireless node and a second uplink transmission to the second wireless node over the fronthaul link.

In Aspect 13, the method of Aspect 12 includes wherein multiplexing the downlink transmissions or multiplexing the first uplink transmission and the second uplink transmission includes multiplexing in frequency based on a single beam.

In Aspect 14, the method of Aspect 12 includes wherein multiplexing the downlink transmissions or multiplexing the first uplink transmission and the second uplink transmission includes multiplexing in space using different antenna elements to form different beams.

In Aspect 15, the method of any of Aspects 12 or 14 includes wherein multiplexing the downlink transmissions and multiplexing the first uplink transmission and the second uplink transmission includes multiplexing the downlink transmission using a first antenna element to form a first beam and multiplexing at least one of the first uplink transmission and the second uplink transmission using a second antenna element to form a second beam for concurrent transmission.

In Aspect 16, the method of Aspect 12 includes wherein multiplexing the downlink transmissions or multiplexing the first uplink transmission and the second uplink transmission includes multiplexing in time based on one or more beams.

In Aspect 17, the method of any of Aspects 1 to 16 further includes indicating, to a wireless network, a capability for supporting at least one of carrier aggregation, dual connectivity, or multi-mobile termination unit over the control connection, wherein establishing the control connection is based at least in part on the capability.

In Aspect 18, the method of any of Aspects 1 to 17 further includes indicating, to a wireless network, a capability for supporting space division multiplexing for the repeater function, wherein providing the repeater function is based at least in part on the capability.

In Aspect 19, the method of Aspects 1 to 18 further includes indicating, to a wireless network, a capability for supporting one or more types of multiplexing for the repeater function based on properties of the two or more wireless nodes, wherein providing the repeater function is based at least in part on the capability.

In Aspect 20, the method of Aspect 19 includes wherein the properties of the two or more nodes correspond to at least one of identities of the cells, identities of the TRPs, identities of the beams, identities of the users, a receive power threshold, or a transmission power threshold associated with the two or more wireless nodes, for which the repeater is capable of supporting one or more types of multiplexing.

Aspect 21 is a method for wireless communication at an upstream node including establishing a control connection with a repeater to provide the repeater with control information for providing a repeater function between two or more wireless nodes, wherein the control connection with the repeater includes at least a first node and a second node, and transmitting, to the repeater, the control information for providing the repeater function.

In Aspect 22, the method of Aspect 21 includes wherein at least the first node and the second nodes are multiple TRPs of the upstream node.

In Aspect 23, the method of Aspect 21 includes wherein at least the first node and the second node are cells of a master cell group, and wherein transmitting the control information includes transmitting the control information to the repeater using carrier aggregation.

In Aspect 24, the method of Aspect 21 includes wherein at least the first node is a cell of a master cell group and the second node is a cell of a secondary cell group, and wherein transmitting the dual connectivity.

In Aspect 25, the method of any of Aspects 21 to 24 includes wherein the control information includes a repeater configuration for controlling the repeater function.

In Aspect 26, the method of Aspect 25 includes wherein transmitting the control information includes transmitting a DCI format, MAC-CE, or RRC message that indicates the repeater configuration.

In Aspect 27, the method of any of Aspects 21 to 26 further includes receiving, from the repeater, an indication of a capability for supporting at least one of carrier aggregation, dual connectivity, or multi-mobile termination unit over the control connection, wherein establishing the control connection is based at least in part on the capability.

In Aspect 28, the method of any of Aspects 21 to 27 further includes receiving, from the repeater, an indication of a capability for supporting space division multiplexing for the repeater function, and generating the control information based at least in part on the capability.

In Aspect 29, the method of any of Aspects 21 to 28 further includes receiving, from the repeater, an indication of a capability for supporting one or more types of multiplexing for the repeater function based on properties of the two or more wireless nodes, and generating the control information based at least in part on the capability.

In Aspect 30, the method of Aspect 29 includes wherein the properties of the two or more nodes correspond to at least one of identities of the cells, identities of the TRPs, identities of the beams, identities of the users, a receive power threshold, or a transmission power threshold associated with the two or more wireless nodes, for which the repeater is capable of supporting one or more types of multiplexing.

In Aspect 31, the method of any of Aspects 29 or 30 further includes transmitting an indication of the properties to the repeater for determining the one or more types of multiplexing.

In Aspect 32, the method of any of Aspects 21 to 31 further includes configuring the repeater to perform and report measurements of the signals associated with the two or more wireless nodes.

Aspect 33 is an apparatus for wireless communication including a transceiver, a memory configured to store instructions, a mobile termination unit, a repeater unit, and one or more processors communicatively coupled with the memory and the transceiver. The one or more processors are configured to establish, via the mobile termination unit, a control connection with at least a first node and a second node for receiving control information for providing a repeater function between two or more wireless nodes, receive the control information over the control connection from one or more of at least the first node or the second node, and provide, via the repeater unit and based on the control information, the repeater function between the two or more wireless nodes.

In Aspect 34, the apparatus of Aspect 33 includes wherein at least the first node and the second node are different TRPs of a serving cell.

In Aspect 35, the apparatus of any of Aspects 33 or 34 includes wherein at least the first node forwards signals from the second node.

In Aspect 36, the apparatus of Aspect 33 includes wherein at least the first node and the second node are different cells of a master cell group.

In Aspect 37, the apparatus of Aspect 33 includes wherein the first node is a cell of a master cell group and the second node is a cell of a secondary cell group.

In Aspect 38, the apparatus of any of Aspects 33 to 37 includes wherein the one or more processors are configured to establish the control connection at least in part by establishing a first control connection with the first node using a first mobile termination unit of the apparatus and establishing a second control connection with the second node using a second mobile termination unit of the apparatus.

In Aspect 39, the apparatus of any of Aspects 33 to 38 includes wherein the control information includes a repeater configuration for controlling the repeater function.

In Aspect 40, the apparatus of Aspect 39 includes wherein the one or more processors are configured to receive the control information at least in part by receiving a DCI format, MAC-CE, or RRC message that indicates the repeater configuration.

In Aspect 41, the apparatus of any of Aspects 39 or 40 includes wherein the one or more processors are configured to receive the control information at least in part by receiving the repeater configuration over the control connection from only the first node.

In Aspect 42, the apparatus of any of Aspects 39 or 40 includes wherein the one or more processors are configured to receive the control information at least in part by receiving the repeater configuration over the control connection from at least the first node and the second node.

In Aspect 43, the apparatus of any of Aspects 39, 40, or 42 wherein the one or more processors are configured to receive the control information at least in part by receiving a first repeater configuration over the control connection from the first node and receiving a second repeater configuration over the control connection from the second node.

In Aspect 44, the apparatus of any of Aspects 33 to 43 includes wherein the one or more processors are configured to provide the repeater function at least in part by at least one of multiplexing downlink transmissions received from at least a first wireless node and a second wireless node of the two or more wireless nodes over a fronthaul link and forwarding the downlink transmissions to at least a third wireless node of the two or more wireless nodes, or multiplexing an uplink transmission received from at least the third wireless node for forwarding as a first uplink transmission to at least the first wireless node and a second uplink transmission to the second wireless node over the fronthaul link.

In Aspect 45, the apparatus of Aspect 44 includes wherein multiplexing the downlink transmissions or multiplexing the first uplink transmission and the second uplink transmission includes multiplexing in frequency based on a single beam.

In Aspect 46, the apparatus of Aspect 44 includes wherein multiplexing the downlink transmissions or multiplexing the first uplink transmission and the second uplink transmission includes multiplexing in space using different antenna elements to form different beams.

In Aspect 47, the apparatus of any of Aspects 44 or 46 includes wherein multiplexing the downlink transmissions and multiplexing the first uplink transmission and the second uplink transmission includes multiplexing the downlink transmission using a first antenna element to form a first beam and multiplexing at least one of the first uplink transmission and the second uplink transmission using a second antenna element to form a second beam for concurrent transmission.

In Aspect 48, the apparatus of Aspect 44 includes wherein multiplexing the downlink transmissions or multiplexing the first uplink transmission and the second uplink transmission includes multiplexing in time based on one or more beams.

In Aspect 49, the apparatus of any of Aspects 33 to 48 includes wherein the one or more processors are further configured to indicate, to a wireless network, a capability for supporting at least one of carrier aggregation, dual connectivity, or multi-mobile termination unit over the control connection, wherein the one or more processors are configured to establish the control connection based at least in part on the capability.

In Aspect 50, the apparatus of any of Aspects 33 to 49 includes wherein the one or more processors are further configured to indicate, to a wireless network, a capability for supporting space division multiplexing for the repeater function, wherein the one or more processors are configured to provide the repeater function based at least in part on the capability.

In Aspect 51, the apparatus of any of Aspects 33 to 50 includes wherein the one or more processors are configured to indicate, to a wireless network, a capability for supporting one or more types of multiplexing for the repeater function based on properties of the two or more wireless nodes, wherein the one or more processors are configured to provide the repeater function based at least in part on the capability.

In Aspect 52, the apparatus of Aspect 51 includes wherein the properties of the two or more nodes correspond to at least one of identities of the cells, identities of the TRPs, identities of the beams, identities of the users, a receive power threshold, or a transmission power threshold associated with the two or more wireless nodes, for which the apparatus is capable of supporting one or more types of multiplexing.

Aspect 53 is an apparatus for wireless communication including a transceiver, a memory configured to store instructions, and one or more processors communicatively coupled with the memory and the transceiver. The one or more processors are configured to establish a control connection with a repeater to provide the repeater with control information for providing a repeater function between two or more wireless nodes, wherein the control connection with the repeater includes at least a first node and a second node, and transmit, to the repeater, the control information for providing the repeater function.

In Aspect 54, the apparatus of Aspect 53 includes wherein at least the first node and the second nodes are multiple TRPs of the apparatus.

In Aspect 55, the apparatus of Aspect 53 includes wherein at least the first node and the second node are cells of a master cell group, and wherein the one or more processors are configured to transmit the control information at least in part by transmitting the control information to the repeater using carrier aggregation.

In Aspect 56, the apparatus of Aspect 53 includes wherein at least the first node is a cell of a master cell group and the second node is a cell of a secondary cell group, and wherein the one or more processors are configured to transmit the control information using dual connectivity.

In Aspect 57, the apparatus of any of Aspects 53 to 56 includes wherein the control information includes a repeater configuration for controlling the repeater function.

In Aspect 58, the apparatus of Aspect 57 includes wherein the one or more processors are configured to transmit the control information at least in part by transmitting a DCI format, MAC-CE, or RRC message that indicates the repeater configuration.

In Aspect 59, the apparatus of any of Aspects 53 to 58 includes wherein the one or more processors are further configured to receive, from the repeater, an indication of a capability for supporting at least one of carrier aggregation, dual connectivity, or multi-mobile termination unit over the control connection, wherein the one or more processors are configured to establish the control connection is based at least in part on the capability.

In Aspect 60, the apparatus of any of Aspects 53 to 59 includes wherein the one or more processors are configured to receive, from the repeater, an indication of a capability for supporting space division multiplexing for the repeater function, and generate the control information based at least in part on the capability.

In Aspect 61, the apparatus of any of Aspects 53 to 60 includes wherein the one or more processors are configured to receive, from the repeater, an indication of a capability for supporting one or more types of multiplexing for the repeater function based on properties of the two or more wireless nodes, and generate the control information based at least in part on the capability.

In Aspect 62, the apparatus of Aspect 61 includes wherein the properties of the two or more nodes correspond to at least one of identities of the cells, identities of the TRPs, identities of the beams, identities of the users, a receive power threshold, or a transmission power threshold associated with the two or more wireless nodes, for which the repeater is capable of supporting one or more types of multiplexing.

In Aspect 63, the apparatus of any of Aspects 61 to 62 includes wherein the one or more processors are further configured to transmit an indication of the properties to the repeater for determining the one or more types of multiplexing.

In Aspect 64, the apparatus of any of Aspects 53 to 63 includes wherein the one or more processors are configured to configure the repeater to perform and report measurements of the signals associated with the two or more wireless nodes.

Aspect 65 is an apparatus for wireless communication including means for establishing a control connection with at least a first node and a second node for receiving control information for providing a repeater function between two or more wireless nodes, means for receiving control information over the control connection from one or more of at least the first node or the second node, and means for providing, based on the control information, the repeater function between the two or more wireless nodes.

In Aspect 66, the apparatus of Aspect 65 includes wherein at least the first node and the second node are different TRPs of a serving cell.

In Aspect 67, the apparatus of any of Aspects 65 or 66 includes wherein at least the first node forwards signals from the second node.

In Aspect 68, the apparatus of Aspect 65 includes wherein at least the first node and the second node are different cells of a master cell group.

In Aspect 69, the apparatus of Aspect 65 includes wherein the first node is a cell of a master cell group and the second node is a cell of a secondary cell group.

In Aspect 70, the apparatus of any of Aspects 65 to 69 includes wherein the means for establishing the control connection includes means for establishing a first control connection with the first node using a first mobile termination unit of the apparatus and establishing a second control connection with the second node using a second mobile termination unit of the apparatus.

In Aspect 71, the apparatus of any of Aspects 65 to 70 includes wherein the control information includes a repeater configuration for controlling the repeater function.

In Aspect 72, the apparatus of Aspect 71 includes wherein the means for receiving the control information includes means for receiving a DCI format, MAC-CE, or RRC message that indicates the repeater configuration.

In Aspect 73, the apparatus of any of Aspects 71 or 72 includes wherein the means for receiving the control information includes means for receiving the repeater configuration over the control connection from only the first node.

In Aspect 74, the apparatus of any of Aspects 71 or 72 includes wherein the means for receiving the control information includes means for receiving the repeater configuration over the control connection from at least the first node and the second node.

In Aspect 75, the apparatus of any of Aspects 71, 72, or 74 includes wherein the means for receiving the control information includes means for receiving a first repeater configuration over the control connection from the first node and receiving a second repeater configuration over the control connection from the second node.

In Aspect 76, the apparatus of any of Aspects 65 to 75 includes wherein the means for providing the repeater function includes at least one of means for multiplexing downlink transmissions received from at least a first wireless node and a second wireless node of the two or more wireless nodes over a fronthaul link and forwarding the downlink transmissions to at least a third wireless node of the two or more wireless nodes, or means for multiplexing an uplink transmission received from at least the third wireless node for forwarding as a first uplink transmission to at least the first wireless node and a second uplink transmission to the second wireless node over the fronthaul link.

In Aspect 77, the apparatus of Aspect 76 includes wherein the means for multiplexing the downlink transmissions or multiplexing the first uplink transmission and the second uplink transmission includes means for multiplexing in frequency based on a single beam.

In Aspect 78, the apparatus of Aspect 76 includes wherein the means for multiplexing the downlink transmissions or multiplexing the first uplink transmission and the second uplink transmission includes means for multiplexing in space using different antenna elements to form different beams.

In Aspect 79, the apparatus of any of Aspects 76 or 78 includes wherein the means for multiplexing the downlink transmissions and multiplexing the first uplink transmission and the second uplink transmission includes means for multiplexing the downlink transmission using a first antenna element to form a first beam and multiplexing at least one of the first uplink transmission and the second uplink transmission using a second antenna element to form a second beam for concurrent transmission.

In Aspect 80, the apparatus of Aspect 76 includes wherein the means for multiplexing the downlink transmissions or multiplexing the first uplink transmission and the second uplink transmission includes means for multiplexing in time based on one or more beams.

In Aspect 81, the apparatus of any of Aspects 65 to 80 further includes means for indicating, to a wireless network, a capability for supporting at least one of carrier aggregation, dual connectivity, or multi-mobile termination unit over the control connection, wherein establishing the control connection is based at least in part on the capability.

In Aspect 82, the apparatus of any of Aspects 65 to 81 further includes means for indicating, to a wireless network, a capability for supporting space division multiplexing for the repeater function, wherein providing the repeater function is based at least in part on the capability.

In Aspect 83, the apparatus of any of Aspects 65 to 82 further includes means for indicating, to a wireless network, a capability for supporting one or more types of multiplexing for the repeater function based on properties of the two or more wireless nodes, wherein the means for providing the repeater function is based at least in part on the capability.

In Aspect 84, the apparatus of Aspect 83 includes wherein the properties of the two or more nodes correspond to at least one of identities of the cells, identities of the TRPs, identities of the beams, identities of the users, a receive power threshold, or a transmission power threshold associated with the two or more wireless nodes, for which the apparatus is capable of supporting one or more types of multiplexing.

Aspect 85 is an apparatus for wireless communication including means for establishing a control connection with a repeater to provide the repeater with control information for providing a repeater function between two or more wireless nodes, wherein the control connection with the repeater includes at least a first node and a second node, and means for transmitting, to the repeater, the control information for providing the repeater function.

In Aspect 86, the apparatus of Aspect 85 includes wherein at least the first node and the second nodes are multiple TRPs of the apparatus.

In Aspect 87, the apparatus of Aspect 85 includes wherein at least the first node and the second node are cells of a master cell group, and wherein the means for transmitting the control information includes means for transmitting the control information to the repeater using carrier aggregation.

In Aspect 88, the apparatus of Aspect 85 includes wherein at least the first node is a cell of a master cell group and the second node is a cell of a secondary cell group, and wherein the means for transmitting the control information transmits using dual connectivity.

In Aspect 89, the apparatus of any of Aspects 85 to 88 includes wherein the control information includes a repeater configuration for controlling the repeater function.

In Aspect 90, the apparatus of Aspect 89 includes wherein the means for transmitting the control information includes means for transmitting a DCI format, MAC-CE, or RRC message that indicates the repeater configuration.

In Aspect 91, the apparatus of any of Aspects 85 to 90 further includes means for receiving, from the repeater, an indication of a capability for supporting at least one of carrier aggregation, dual connectivity, or multi-mobile termination unit over the control connection, wherein the means for establishing the control connection is based at least in part on the capability.

In Aspect 92, the apparatus of any of Aspects 85 to 91 further includes means for receiving, from the repeater, an indication of a capability for supporting space division multiplexing for the repeater function, and means for generating the control information based at least in part on the capability.

In Aspect 93, the apparatus of any of Aspects 85 to 92 further includes means for receiving, from the repeater, an indication of a capability for supporting one or more types of multiplexing for the repeater function based on properties of the two or more wireless nodes, and means for generating the control information based at least in part on the capability.

In Aspect 94, the apparatus of Aspect 93 includes wherein the properties of the two or more nodes correspond to at least one of identities of the cells, identities of the TRPs, identities of the beams, identities of the users, a receive power threshold, or a transmission power threshold associated with the two or more wireless nodes, for which the repeater is capable of supporting one or more types of multiplexing.

In Aspect 95, the apparatus of any of Aspects 93 or 94 further includes means for transmitting an indication of the properties to the repeater for determining the one or more types of multiplexing.

In Aspect 96, the apparatus of any of Aspects 85 to 95 further includes means for configuring the repeater to perform and report measurements of the signals associated with the two or more wireless nodes.

Aspect 97 is a computer-readable medium, including code executable by one or more processors for wireless communications at a repeater. The code includes code for establishing a control connection with at least a first node and a second node for receiving control information for providing a repeater function between two or more wireless nodes, receiving the control information over the control connection from one or more of at least the first node or the second node, and providing, based on the control information, the repeater function between the two or more wireless nodes.

In Aspect 98, the computer-readable medium of Aspect 97 includes wherein at least the first node and the second node are different TRPs of a serving cell.

In Aspect 99, the computer-readable medium of any of Aspects 97 or 98 includes wherein at least the first node forwards signals from the second node.

In Aspect 100, the computer-readable medium of Aspect 97 includes wherein at least the first node and the second node are different cells of a master cell group.

In Aspect 101, the computer-readable medium of Aspect 97 includes wherein the first node is a cell of a master cell group and the second node is a cell of a secondary cell group.

In Aspect 102, the computer-readable medium of any of Aspects 97 to 101 includes wherein the code for establishing the control connection includes code for establishing a first control connection with the first node using a first mobile termination unit of the repeater and establishing a second control connection with the second node using a second mobile termination unit of the repeater.

In Aspect 103, the computer-readable medium of any of Aspects 97 to 102 includes wherein the control information includes a repeater configuration for controlling the repeater function.

In Aspect 104, the computer-readable medium of Aspect 103 includes wherein the code for receiving the control information includes code for receiving a DCI format, MAC-CE, or RRC message that indicates the repeater configuration.

In Aspect 105, the computer-readable medium of any of Aspects 103 or 104 includes wherein the code for receiving the control information includes code for receiving the repeater configuration over the control connection from only the first node.

In Aspect 106, the computer-readable medium of any of Aspects 103 or 104 includes wherein the code for receiving the control information includes code for receiving the repeater configuration over the control connection from at least the first node and the second node.

In Aspect 107, the computer-readable medium of any of Aspects 103, 104, or 106 wherein the code for receiving the control information includes code for receiving a first repeater configuration over the control connection from the first node and receiving a second repeater configuration over the control connection from the second node.

In Aspect 108, the computer-readable medium of any of Aspects 97 to 107 includes wherein the code for providing the repeater function includes at least one of code for multiplexing downlink transmissions received from at least a first wireless node and a second wireless node of the two or more wireless nodes over a fronthaul link and forwarding the downlink transmissions to at least a third wireless node of the two or more wireless nodes, or code for multiplexing an uplink transmission received from at least the third wireless node for forwarding as a first uplink transmission to at least the first wireless node and a second uplink transmission to the second wireless node over the fronthaul link.

In Aspect 109, the computer-readable medium of Aspect 108 includes wherein the code for multiplexing the downlink transmissions or multiplexing the first uplink transmission and the second uplink transmission includes code for multiplexing in frequency based on a single beam.

In Aspect 110, the computer-readable medium of Aspect 108 includes wherein the code for multiplexing the downlink transmissions or multiplexing the first uplink transmission and the second uplink transmission includes code for multiplexing in space using different antenna elements to form different beams.

In Aspect 111, the computer-readable medium of any of Aspects 108 or 110 includes wherein the code for multiplexing the downlink transmissions and multiplexing the first uplink transmission and the second uplink transmission includes code for multiplexing the downlink transmission using a first antenna element to form a first beam and multiplexing at least one of the first uplink transmission and the second uplink transmission using a second antenna element to form a second beam for concurrent transmission.

In Aspect 112, the computer-readable medium of Aspect 108 includes wherein the code for multiplexing the downlink transmissions or multiplexing the first uplink transmission and the second uplink transmission includes code for multiplexing in time based on one or more beams.

In Aspect 113, the computer-readable medium of any of Aspects 97 to 112 further includes code for indicating, to a wireless network, a capability for supporting at least one of carrier aggregation, dual connectivity, or multi-mobile termination unit over the control connection, wherein establishing the control connection is based at least in part on the capability.

In Aspect 114, the computer-readable medium of any of Aspects 97 to 113 further includes code for indicating, to a wireless network, a capability for supporting space division multiplexing for the repeater function, wherein providing the repeater function is based at least in part on the capability.

In Aspect 115, the computer-readable medium of any of Aspects 97 to 114 further includes code for indicating, to a wireless network, a capability for supporting one or more types of multiplexing for the repeater function based on properties of the two or more wireless nodes, wherein the code for providing the repeater function is based at least in part on the capability.

In Aspect 116, the computer-readable medium of Aspect 115 includes wherein the properties of the two or more nodes correspond to at least one of identities of the cells, identities of the TRPs, identities of the beams, identities of the users, a receive power threshold, or a transmission power threshold associated with the two or more wireless nodes, for which the repeater is capable of supporting one or more types of multiplexing.

Aspect 117 is a computer-readable medium, including code executable by one or more processors for wireless communications at an upstream node. The code includes code for establishing a control connection with a repeater to provide the repeater with control information for providing a repeater function between two or more wireless nodes, wherein the control connection with the repeater includes at least a first node and a second node, and transmitting, to the repeater, the control information for providing the repeater function.

In Aspect 118, the computer-readable medium of Aspect 117 includes wherein at least the first node and the second nodes are multiple TRPs of the upstream node.

In Aspect 119, the computer-readable medium of Aspect 117 includes wherein at least the first node and the second node are cells of a master cell group, and wherein the code for transmitting the control information includes code for transmitting the control information to the repeater using carrier aggregation.

In Aspect 120, the computer-readable medium of Aspect 117 includes wherein at least the first node is a cell of a master cell group and the second node is a cell of a secondary cell group, and wherein the code for transmitting the control information transmits using dual connectivity.

In Aspect 121, the computer-readable medium of any of Aspects 117 to 120 includes wherein the control information includes a repeater configuration for controlling the repeater function.

In Aspect 122, the computer-readable medium of Aspect 121 includes wherein the code for transmitting the control information includes code for transmitting a DCI format, MAC-CE, or RRC message that indicates the repeater configuration.

In Aspect 123, the computer-readable medium of any of Aspects 117 to 122 further includes code for receiving, from the repeater, an indication of a capability for supporting at least one of carrier aggregation, dual connectivity, or multi-mobile termination unit over the control connection, wherein the code for establishing the control connection is based at least in part on the capability.

In Aspect 124, the computer-readable medium of any of Aspects 117 to 123 further includes code for receiving, from the repeater, an indication of a capability for supporting space division multiplexing for the repeater function, and code for generating the control information based at least in part on the capability.

In Aspect 125, the computer-readable medium of any of Aspects 117 to 124 further includes code for receiving, from the repeater, an indication of a capability for supporting one or more types of multiplexing for the repeater function based on properties of the two or more wireless nodes, and code for generating the control information based at least in part on the capability.

In Aspect 126, the computer-readable medium of Aspect 125 includes wherein the properties of the two or more nodes correspond to at least one of identities of the cells, identities of the TRPs, identities of the beams, identities of the users, a receive power threshold, or a transmission power threshold associated with the two or more wireless nodes, for which the repeater is capable of supporting one or more types of multiplexing.

In Aspect 127, the computer-readable medium of any of Aspects 125 or 126 further includes code for transmitting an indication of the properties to the repeater for determining the one or more types of multiplexing.

In Aspect 128, the computer-readable medium of any of Aspects 117 to 127 further includes code for configuring the repeater to perform and report measurements of the signals associated with the two or more wireless nodes.

Aspect 129 is a method for wireless communication at a repeater including establishing a control connection with at least a first node for receiving control information for providing a repeater function for one or more upstream nodes, receiving the control information over the control connection, determining a conflict in receiving the control information or a conflict within the control information for two or more upstream nodes, and providing, based on the control information and based on the conflict, the repeater function for the one or more upstream nodes.

In Aspect 130, the method of Aspect 129 includes wherein the conflict in receiving the control information is based on receiving a first indication to monitor for the control information from at least the first node in a first search space and a second indication to monitor for the control information from at least a second node in a second search space.

In Aspect 131, the method of any of Aspects 129 or 130 includes wherein the conflict in receiving the control information is based on receiving a first indication to monitor for the control information from at least the first node as a first cell and a second indication to monitor for the control information from at least a second node as a second cell.

In Aspect 132, the method of any of Aspects 129 to 131 includes wherein the conflict in the control information is based on receiving first control information from at least the first node and receiving second control information from at least a second node.

In Aspect 133, the method of any of Aspects 129 to 132 includes wherein providing the repeater function includes prioritizing the control information from first upstream node of the two or more upstream nodes based on determining that the first upstream node is associated with a primary cell.

In Aspect 134, the method of any of Aspects 129 to 132 includes wherein providing the repeater function includes prioritizing the control information from a first upstream node of the two or more upstream nodes based on determining that the first upstream node is associated with a master cell group.

In Aspect 135, the method of any of Aspects 129 to 134 includes wherein providing the repeater function includes prioritizing the control information that is most recently received.

In Aspect 136, the method of any of Aspects 129 to 135 includes wherein providing the repeater function includes prioritizing the control information based on at least one of a beam, channel, or communication direction associated with the control information.

In Aspect 137, the method of any of Aspects 129 to 136 includes wherein providing the repeater function includes prioritizing the control information based on a prioritization index associated with the control information.

In Aspect 138, the method of any of Aspects 129 to 137 includes wherein providing the repeater function includes prioritizing the control information or associated configuration for a period of time for a first upstream node of the two or more upstream nodes and cancelling the control information or associated configuration for the period of time for a second upstream node of the two or more upstream nodes.

In Aspect 139, the method of any of Aspects 129 to 132 includes wherein providing the repeater function includes cancelling the control information or associated configuration for a period of time for a first upstream node and a second upstream node of the two or more upstream nodes based on the conflict.

In Aspect 140, the method of any of Aspects 129 to 139 includes transmitting an indication of the conflict to one or more of the two or more upstream nodes.

In Aspect 141, the method of any of Aspects 129 to 140 includes transmitting an indication of suggested control information to one or more of the two or more upstream nodes, wherein receiving the control information is based on the suggested control information.

In Aspect 142, the method of any of Aspects 129 to 141 includes transmitting an indication of the control information of a first upstream node of the two or more upstream nodes to a second upstream node of the two or more upstream nodes.

Aspect 143 is a method for wireless communication at an upstream node including establishing a control connection with a repeater or one or more other nodes having a control connection with the repeater, to provide control information for providing a repeater function for one or more upstream nodes, determining the control information for the repeater based on information of the one or more other nodes, and transmitting, to at least one of the repeater or the one or more other nodes, the control information for providing the repeater function.

In Aspect 144, the method of Aspect 143 includes wherein the upstream node is one of the one or more other nodes.

In Aspect 145, the method of any of Aspects 143 or 144 includes receiving the information of the one or more other nodes, from a centralized unit or directly from the one or more other nodes, wherein the information includes at least one of a repeater configuration, communication schedule, TDD pattern, beam pattern, or power configuration.

In Aspect 146, the method of Aspect 145 includes wherein the centralized unit serves at least one of the one or more upstream nodes as a serving cell for the repeater.

In Aspect 147, the method of any of Aspects 145 or 146 includes wherein the centralized unit receives the information from another centralized unit that services at least one of the one or more other nodes.

In Aspect 148, the method of any of Aspects 143 to 147 includes wherein determining the control information includes coordinating the repeater configuration, communication schedule, TDD pattern, beam pattern, or power configuration based on the information of the one or more other nodes.

Aspect 149 is an apparatus for wireless communication including a transceiver, a memory configured to store instructions, a mobile termination unit, a repeater unit, and one or more processors communicatively coupled with the memory and the transceiver. The one or more processors are configured to establish a control connection with at least a first node for receiving control information for providing a repeater function for one or more upstream nodes, receive the control information over the control connection, determine a conflict in receiving the control information or a conflict within the control information for two or more upstream nodes, and provide, based on the control information and based on the conflict, the repeater function for the one or more upstream nodes.

In Aspect 150, the apparatus of Aspect 149 includes wherein the conflict in receiving the control information is based on receiving a first indication to monitor for the control information from at least the first node in a first search space and a second indication to monitor for the control information from at least a second node in a second search space.

In Aspect 151, the apparatus of any of Aspects 149 or 150 includes wherein the conflict in receiving the control information is based on receiving a first indication to monitor for the control information from at least the first node as a first cell and a second indication to monitor for the control information from at least a second node as a second cell.

In Aspect 152, the apparatus of any of Aspects 149 to 151 includes wherein the conflict in the control information is based on receiving first control information from at least the first node and receiving second control information from at least a second node.

In Aspect 153, the apparatus of any of Aspects 149 to 152 includes wherein the one or more processors are configured to provide the repeater function at least in part by prioritizing the control information from first upstream node of the two or more upstream nodes based on determining that the first upstream node is associated with a primary cell.

In Aspect 154, the apparatus of any of Aspects 149 to 152 includes wherein the one or more processors are configured to provide the repeater function at least in part by prioritizing the control information from a first upstream node of the two or more upstream nodes based on determining that the first upstream node is associated with a master cell group.

In Aspect 155, the apparatus of any of Aspects 149 to 154 includes wherein the one or more processors are configured to provide the repeater function at least in part by prioritizing the control information that is most recently received.

In Aspect 156, the apparatus of any of Aspects 149 to 155 includes wherein the one or more processors are configured to provide the repeater function at least in part by prioritizing the control information based on at least one of a beam, channel, or communication direction associated with the control information.

In Aspect 157, the apparatus of any of Aspects 149 to 156 includes wherein the one or more processors are configured to provide the repeater function at least in part by prioritizing the control information based on a prioritization index associated with the control information.

In Aspect 158, the apparatus of any of Aspects 149 to 157 includes wherein the one or more processors are configured to provide the repeater function at least in part by prioritizing the control information or associated configuration for a period of time for a first upstream node of the two or more upstream nodes and cancelling the control information or associated configuration for the period of time for a second upstream node of the two or more upstream nodes.

In Aspect 159, the apparatus of any of Aspects 149 to 152 includes wherein the one or more processors are configured to provide the repeater function at least in part by cancelling the control information or associated configuration for a period of time for a first upstream node and a second upstream node of the two or more upstream nodes based on the conflict.

In Aspect 160, the apparatus of any of Aspects 149 to 159 includes wherein the one or more processors are further configured to transmit an indication of the conflict to one or more of the two or more upstream nodes.

In Aspect 161, the apparatus of any of Aspects 149 to 160 includes wherein the one or more processors are further configured to transmit an indication of suggested control information to one or more of the two or more upstream nodes, wherein the one or more processors are configured to receive the control information based on the suggested control information.

In Aspect 162, the apparatus of any of Aspects 149 to 161 includes wherein the one or more processors are further configured to transmit an indication of the control information of a first upstream node of the two or more upstream nodes to a second upstream node of the two or more upstream nodes.

Aspect 163 is an apparatus for wireless communication including a transceiver, a memory configured to store instructions, and one or more processors communicatively coupled with the memory and the transceiver. The one or more processors are configured to establish a control connection with a repeater or one or more other nodes having a control connection with the repeater, to provide control information for providing a repeater function for one or more upstream nodes, determine the control information for the repeater based on information of the one or more other nodes, and transmit, to at least one of the repeater or the one or more other nodes, the control information for providing the repeater function.

In Aspect 164, the apparatus of Aspect 163 includes wherein the apparatus is one of the one or more other nodes.

In Aspect 165, the apparatus of any of Aspects 163 or 164 includes wherein the one or more processors are further configured to receive the information of the one or more other nodes, from a centralized unit or directly from the one or more other nodes, wherein the information includes at least one of a repeater configuration, communication schedule, TDD pattern, beam pattern, or power configuration.

In Aspect 166, the apparatus of Aspect 165 includes wherein the centralized unit serves at least one of the one or more upstream nodes as a serving cell for the repeater.

In Aspect 167, the apparatus of any of Aspects 165 or 166 includes wherein the centralized unit receives the information from another centralized unit that services at least one of the one or more other nodes.

In Aspect 168, the apparatus of any of Aspects 163 to 167 includes wherein the one or more processors are configured to determine the control information at least in part by coordinating the repeater configuration, communication schedule, TDD pattern, beam pattern, or power configuration based on the information of the one or more other nodes.

Aspect 169 is an apparatus for wireless communication including means for establishing a control connection with at least a first node for receiving control information for providing a repeater function for one or more upstream nodes, means for receiving the control information over the control connection, means for determining a conflict in receiving the control information or a conflict within the control information for two or more upstream nodes, and means for providing, based on the control information and based on the conflict, the repeater function for the one or more upstream nodes.

In Aspect 170, the apparatus of Aspect 169 includes wherein the conflict in receiving the control information is based on receiving a first indication to monitor for the control information from at least the first node in a first search space and a second indication to monitor for the control information from at least a second node in a second search space.

In Aspect 171, the apparatus of any of Aspects 169 or 170 includes wherein the conflict in receiving the control information is based on receiving a first indication to monitor for the control information from at least the first node as a first cell and a second indication to monitor for the control information from at least a second node as a second cell.

In Aspect 172, the apparatus of any of Aspects 169 to 171 includes wherein the conflict in the control information is based on receiving first control information from at least the first node and receiving second control information from at least a second node.

In Aspect 173, the apparatus of any of Aspects 169 to 172 includes wherein the means for providing the repeater function includes means for prioritizing the control information from first upstream node of the two or more upstream nodes based on determining that the first upstream node is associated with a primary cell.

In Aspect 174, the apparatus of any of Aspects 169 to 172 includes wherein the means for providing the repeater function includes means for prioritizing the control information from a first upstream node of the two or more upstream nodes based on determining that the first upstream node is associated with a master cell group.

In Aspect 175, the apparatus of any of Aspects 169 to 174 includes wherein the means for providing the repeater function includes means for prioritizing the control information that is most recently received.

In Aspect 176, the apparatus of any of Aspects 169 to 175 includes wherein the means for providing the repeater function includes means for prioritizing the control information based on at least one of a beam, channel, or communication direction associated with the control information.

In Aspect 177, the apparatus of any of Aspects 169 to 176 includes wherein the means for providing the repeater function includes means for prioritizing the control information based on a prioritization index associated with the control information.

In Aspect 178, the apparatus of any of Aspects 169 to 177 includes wherein the means for providing the repeater function includes means for prioritizing the control information or associated configuration for a period of time for a first upstream node of the two or more upstream nodes and cancelling the control information or associated configuration for the period of time for a second upstream node of the two or more upstream nodes.

In Aspect 179, the apparatus of any of Aspects 169 to 172 includes wherein the means for providing the repeater function includes means for cancelling the control information or associated configuration for a period of time for a first upstream node and a second upstream node of the two or more upstream nodes based on the conflict.

In Aspect 180, the apparatus of any of Aspects 169 to 179 includes means for transmitting an indication of the conflict to one or more of the two or more upstream nodes.

In Aspect 181, the apparatus of any of Aspects 169 to 180 includes means for transmitting an indication of suggested control information to one or more of the two or more upstream nodes, wherein the means for receiving the control information is based on the suggested control information.

In Aspect 182, the apparatus of any of Aspects 169 to 181 includes means for transmitting an indication of the control information of a first upstream node of the two or more upstream nodes to a second upstream node of the two or more upstream nodes.

Aspect 183 is an apparatus for wireless communication including means for establishing a control connection with a repeater or one or more other nodes having a control connection with the repeater, to provide control information for providing a repeater function for one or more upstream nodes, means for determining the control information for the repeater based on information of the one or more other nodes, and means for transmitting, to at least one of the repeater or the one or more other nodes, the control information for providing the repeater function.

In Aspect 184, the apparatus of Aspect 183 includes wherein the apparatus is one of the one or more other nodes.

In Aspect 185, the apparatus of any of Aspects 183 or 184 includes means for receiving the information of the one or more other nodes, from a centralized unit or directly from the one or more other nodes, wherein the information includes at least one of a repeater configuration, communication schedule, TDD pattern, beam pattern, or power configuration.

In Aspect 186, the apparatus of Aspect 185 includes wherein the centralized unit serves at least one of the one or more upstream nodes as a serving cell for the repeater.

In Aspect 187, the apparatus of any of Aspects 185 or 186 includes wherein the centralized unit receives the information from another centralized unit that services at least one of the one or more other nodes.

In Aspect 188, the apparatus of any of Aspects 183 to 187 includes wherein the means for determining the control information includes means for coordinating the repeater configuration, communication schedule, TDD pattern, beam pattern, or power configuration based on the information of the one or more other nodes.

Aspect 189 is a computer-readable medium including code executable by one or more processors for wireless communications at a repeater. The code includes code for establishing a control connection with at least a first node for receiving control information for providing a repeater function for one or more upstream nodes, receiving the control information over the control connection, determining a conflict in receiving the control information or a conflict within the control information for two or more upstream nodes, and providing, based on the control information and based on the conflict, the repeater function for the one or more upstream nodes.

In Aspect 190, the computer-readable medium of Aspect 189 includes wherein the conflict in receiving the control information is based on receiving a first indication to monitor for the control information from at least the first node in a first search space and a second indication to monitor for the control information from at least a second node in a second search space.

In Aspect 191, the computer-readable medium of any of Aspects 189 or 190 includes wherein the conflict in receiving the control information is based on receiving a first indication to monitor for the control information from at least the first node as a first cell and a second indication to monitor for the control information from at least a second node as a second cell.

In Aspect 192, the computer-readable medium of any of Aspects 189 to 191 includes wherein the conflict in the control information is based on receiving first control information from at least the first node and receiving second control information from at least a second node.

In Aspect 193, the computer-readable medium of any of Aspects 189 to 192 includes wherein the code for providing the repeater function includes code for prioritizing the control information from first upstream node of the two or more upstream nodes based on determining that the first upstream node is associated with a primary cell.

In Aspect 194, the computer-readable medium of any of Aspects 189 to 192 includes wherein the code for providing the repeater function includes code for prioritizing the control information from a first upstream node of the two or more upstream nodes based on determining that the first upstream node is associated with a master cell group.

In Aspect 195, the computer-readable medium of any of Aspects 189 to 194 includes wherein the code for providing the repeater function includes code for prioritizing the control information that is most recently received.

In Aspect 196, the computer-readable medium of any of Aspects 189 to 195 includes wherein the code for providing the repeater function includes code for prioritizing the control information based on at least one of a beam, channel, or communication direction associated with the control information.

In Aspect 197, the computer-readable medium of any of Aspects 189 to 196 includes wherein the code for providing the repeater function includes code for prioritizing the control information based on a prioritization index associated with the control information.

In Aspect 198, the computer-readable medium of any of Aspects 189 to 197 includes wherein the code for providing the repeater function includes code for prioritizing the control information or associated configuration for a period of time for a first upstream node of the two or more upstream nodes and cancelling the control information or associated configuration for the period of time for a second upstream node of the two or more upstream nodes.

In Aspect 199, the computer-readable medium of any of Aspects 189 to 172 includes wherein the code for providing the repeater function includes code for cancelling the control information or associated configuration for a period of time for a first upstream node and a second upstream node of the two or more upstream nodes based on the conflict.

In Aspect 200, the computer-readable medium of any of Aspects 189 to 199 includes code for transmitting an indication of the conflict to one or more of the two or more upstream nodes.

In Aspect 201, the computer-readable medium of any of Aspects 189 to 200 includes code for transmitting an indication of suggested control information to one or more of the two or more upstream nodes, wherein the code for receiving the control information is based on the suggested control information.

In Aspect 202, the computer-readable medium of any of Aspects 189 to 201 includes code for transmitting an indication of the control information of a first upstream node of the two or more upstream nodes to a second upstream node of the two or more upstream nodes.

Aspect 203 is a computer-readable medium including code executable by one or more processors for wireless communications at an upstream node. The code includes code for establishing a control connection with a repeater or one or more other nodes having a control connection with the repeater, to provide control information for providing a repeater function for one or more upstream nodes, determining the control information for the repeater based on information of the one or more other nodes, and transmitting, to at least one of the repeater or the one or more other nodes, the control information for providing the repeater function.

In Aspect 204, the computer-readable medium of Aspect 203 includes wherein the upstream node is one of the one or more other nodes.

In Aspect 205, the computer-readable medium of any of Aspects 203 or 204 includes code for receiving the information of the one or more other nodes, from a centralized unit or directly from the one or more other nodes, wherein the information includes at least one of a repeater configuration, communication schedule, TDD pattern, beam pattern, or power configuration.

In Aspect 206, the computer-readable medium of Aspect 205 includes wherein the centralized unit serves at least one of the one or more upstream nodes as a serving cell for the repeater.

In Aspect 207, the computer-readable medium of any of Aspects 205 or 206 includes wherein the centralized unit receives the information from another centralized unit that services at least one of the one or more other nodes.

In Aspect 208, the computer-readable medium of any of Aspects 203 to 207 includes wherein the code for determining the control information includes code for coordinating the repeater configuration, communication schedule, TDD pattern, beam pattern, or power configuration based on the information of the one or more other nodes.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a field-programmable gate array (FPGA) or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising: a transceiver; a memory configured to store instructions; a mobile termination unit; a repeater unit; and one or more processors communicatively coupled with the memory and the transceiver, wherein the one or more processors are configured to: establish, via the mobile termination unit, a first control connection with at least a first node for receiving first control information for providing a repeater function between two or more wireless nodes, and a second control connection with a second node for receiving second control information for providing the repeater function between the two or more wireless nodes, wherein at least one wireless node of the two or more wireless nodes is not the first node and is not the second node; receive the first control information over the first control connection or the second control information over the second control connection; and provide, via the repeater unit and based on the first control information or the second control information, the repeater function between the two or more wireless nodes.

2. The apparatus of claim 1, wherein at least the first node and the second node are different transmission/reception points (TRPs) of a serving cell.

3. The apparatus of claim 1, wherein at least the first node forwards signals from the second node.

4. The apparatus of claim 1, wherein at least the first node and the second node are different cells of a master cell group.

5. The apparatus of claim 1, wherein the first node is a cell of a master cell group and the second node is a cell of a secondary cell group.

6. The apparatus of claim 1, wherein the one or more processors are configured to establish the first control connection at least in part by establishing a first control connection with the first node using a first mobile termination unit of the apparatus and establish the second control connection with the second node using a second mobile termination unit of the apparatus.

7. The apparatus of claim 1, wherein the first control information or the second control information includes a repeater configuration for controlling the repeater function.

8. The apparatus of claim 7, wherein the one or more processors are configured to receive the first control information or the second control information at least in part by receiving a downlink control information (DCI) format, media access control (MAC)-control element (CE), or radio resource control (RRC) message that indicates the repeater configuration.

9. The apparatus of claim 7, wherein the one or more processors are configured to receive the first control information at least in part by receiving the repeater configuration over the first control connection from the first node or receive the second control information at least in part by receiving the repeater configuration over the second control connection from the second node.

10. The apparatus of claim 1, wherein the one or more processors are configured to provide the repeater function at least in part by at least one of: multiplexing downlink transmissions received from at least a first wireless node and a second wireless node of the two or more wireless nodes over a fronthaul link and forwarding the downlink transmissions to at least a third wireless node of the two or more wireless nodes; or multiplexing an uplink transmission received from at least the third wireless node for forwarding as a first uplink transmission to at least the first wireless node and a second uplink transmission to the second wireless node over the fronthaul link.

11. The apparatus of claim 10, wherein multiplexing the downlink transmissions or multiplexing the first uplink transmission and the second uplink transmission includes at least one of multiplexing in frequency based on a single beam, multiplexing in space using different antenna elements to form different beams, multiplexing the downlink transmissions using a first antenna element to form a first beam and multiplexing at least one of the first uplink transmission and the second uplink transmission using a second antenna element to form a second beam for concurrent transmission, or multiplexing the first uplink transmission and the second uplink transmission includes multiplexing in time based on one or more beams.

12. The apparatus of claim 1, wherein the one or more processors are further configured to indicate, to a wireless network, a capability for supporting at least one of carrier aggregation, dual connectivity, or multi-mobile termination unit over a control connection, wherein the one or more processors are configured to establish the first control connection and the second control connection based at least in part on the capability.

13. The apparatus of claim 1, wherein the one or more processors are further configured to indicate, to a wireless network, a capability for supporting space division multiplexing for the repeater function, wherein the one or more processors are configured to provide the repeater function based at least in part on the capability.

14. The apparatus of claim 1, wherein the one or more processors are configured to indicate, to a wireless network, a capability for supporting one or more types of multiplexing for the repeater function based on properties of the two or more wireless nodes, wherein the one or more processors are configured to provide the repeater function based at least in part on the capability.

15. The apparatus of claim 14, wherein the properties of the two or more wireless nodes correspond to at least one of identities of cells, identities of transmission/reception points (TRPs), identities of beams, identities of users, a receive power threshold, or a transmission power threshold associated with the two or more wireless nodes, for which the repeater function is capable of supporting one or more types of multiplexing.

16. A method for wireless communication at a repeater, comprising: establishing a first control connection with at least a first node for receiving first control information for providing a repeater function between two or more wireless nodes, and a second control connection with a second node for receiving second control information for providing the repeater function between the two or more wireless nodes, wherein at least one wireless node of the two or more wireless nodes is not the first node and is not the second node; receiving the first control information over the first control connection or the second control information over the second control connection; and providing, based on the first control information or the second control information, the repeater function between the two or more wireless nodes.

17. The method of claim 16, wherein at least the first node and the second node are different transmission/reception points (TRPs) of a serving cell.

* * * * *